United States Patent
Tamatsu

(10) Patent No.: US 6,934,877 B2
(45) Date of Patent: Aug. 23, 2005

(54) DATA BACKUP/RECOVERY SYSTEM

(75) Inventor: Masaharu Tamatsu, Tama (JP)

(73) Assignee: Annex Systems Incorporated, Tokyo (JP)

( * ) Notice: Subject to any disclaimer, the term of this patent is extended or adjusted under 35 U.S.C. 154(b) by 514 days.

(21) Appl. No.: 09/980,619

(22) PCT Filed: Apr. 11, 2001

(86) PCT No.: PCT/JP01/03126

§ 371 (c)(1),
(2), (4) Date: Feb. 12, 2002

(87) PCT Pub. No.: WO01/77835

PCT Pub. Date: Oct. 18, 2001

(65) Prior Publication Data

US 2003/0074600 A1 Apr. 17, 2003

(30) Foreign Application Priority Data

Apr. 12, 2000 (JP) .......................................... 2000-111299
Mar. 29, 2001 (JP) .......................................... 2001-094678

(51) Int. Cl.⁷ ................................................. G06F 11/00
(52) U.S. Cl. ............................................................. 714/5
(58) Field of Search ............................................. 714/5

(56) References Cited

U.S. PATENT DOCUMENTS 5,742,792 A * 4/1998 Yanai et al. ................. 711/162

FOREIGN PATENT DOCUMENTS

EP          923 030 A1 * 6/1999 ........... G06F/12/00

* cited by examiner

*Primary Examiner*—Bryce P. Bonzo
(74) *Attorney, Agent, or Firm*—Apex Juris, pllc; Tracy M Heims

(57) ABSTRACT

This data backup and recovery system enables backup and recovery of data at low cost and in short periods of time. The system is comprised of a primary system that updates the source data and one or more secondary systems that back up the source data. The secondary systems may be installed in the vicinity of the primary system or at a remote location. The secondary systems have the same logical configuration as the primary system and perform backups by acquiring the most recent data in real time. The update histories maintained by the secondary systems may be used to restore the primary system to any given state at an earlier point in time. Using a secondary system as a referential tool enables load distribution; the backup processing of the secondary system may then be suspended to perform referential batch processing while it is detached from on-line processing.

6 Claims, 9 Drawing Sheets

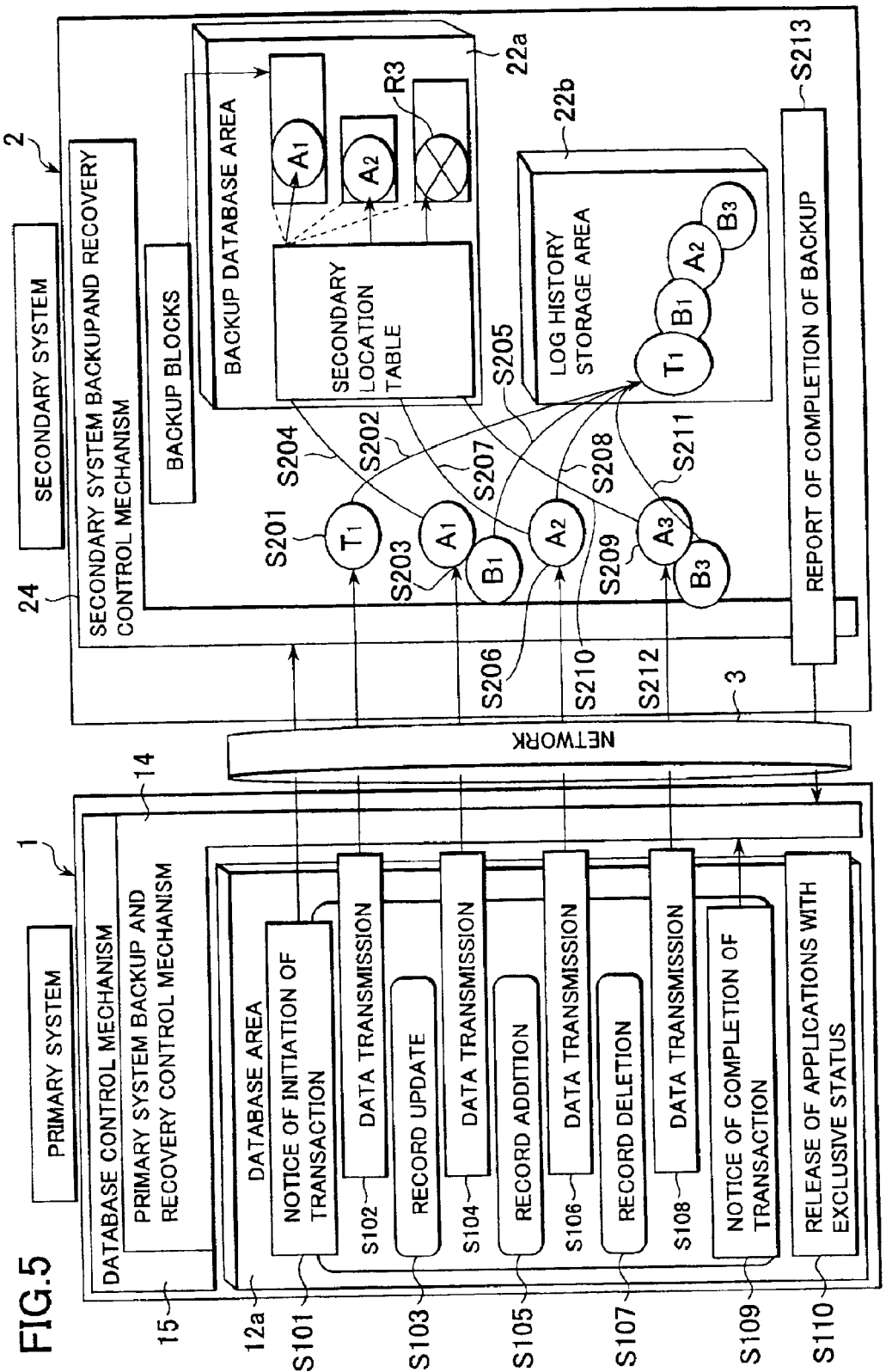

DATA BACKUP/RECOVERY SYSTEM

BACKGROUND OF THE INVENTION

1. Field of the Invention

This invention relates to the field of computer data backup and recovery, and particularly to an improved computer data backup and recovery system that both reduces the time and trouble involved in data backup by storing in a secondary system such changes as are made to the data on a primary system each time such a change is made and reduces the time and trouble required for data recovery by using that backup data.

2. Description of Related Art

In order to avoid the loss of and disruption to data due to hardware failure, software failure or disaster, data backup is in general a mandatory aspect of database architecture and management using computers.

Several methods have been developed for ways of backing up data in the field of computers. These methods are commonly contingencies for the problems foreseen by their developers.

One of several such data backup method in the prior art is periodically to acquire copies of complete files. In this data backup method, updates to the source data (By source data, we refer here and below to that data directly acted on, or processed by, the computer system.) performed after the data is copied are not reflected in the backup files. Therefore, this method of data backup entails the danger that large volumes of updated data may be lost, although that volume will vary with the backup interval.

A second data backup method is periodically to make copies of complete files and, when files are updated between backups, to store that update data in logfiles. Performed primarily as on-line processing, in addition to acquiring copies of complete files on magnetic tape or other media periodically, this involves acquiring logfiles with a magnetic disk device, magnetic tape device or similar equipment when files are updated during the intervals between periodic copying of the complete files. There are some differences between specific applications of this backup method.

In brief, copies of complete files are acquired to provide for the possibility of destruction of the files containing the data. The copies are acquired at daily or weekly frequencies, although the specific cycle would be determined by the particular application. One variation of this method is to segment the files containing the source data rather than copying them in toto.

In traditional applications of this second data backup method, updates are suspended when the copies are acquired in order to maintain data integrity.

In such applications of this method, logfiles of updates are acquired when the source data is updated after the file copies have been obtained. The data logged comprises three types: transaction logs (referred to below as "T logs") of the update data itself, pre-update image logs (referred to below as "B logs") of the data updated and post-update logs (referred to below as "A logs") of the data updated.

As a simple description of these logs, consider a bank account with a balance of 100,000 yen. A withdrawal of 10,000 yen results in a balance of 90,000 yen. In this case, the B log records the initial balance of 100,000 yen, the T log records the withdrawal of 10,000 yen and the A log records the resulting balance of 90,000 yen.

If for some reason the source data were destroyed in a computer failure, the complete copies most recently acquired or that part of the complete copies corresponding to the data destroyed would be used to restore the data to its state at the time the source data was copied. Then the log data generated since the copies were obtained would be used to restore the data to its state immediately prior to the destruction of the files. Such traditional applications of this second data backup method have suffered from the drawback of the considerable time required to acquire the file copies and restore the data when files are destroyed as the volume of the source data expands. A further drawback of this method is the difficulty of 24-hour operation since data updates must be suspended when file copies are acquired.

This first data backup method and second data backup method are contingencies for file and device damage.

A third data backup method is provided for such situations as abnormal termination of a program and transaction cancellations. As a contingency for abnormal program termination and transaction cancellations, this third data backup method is one of storing pre-update data (B log data) updated by a transaction (a set of processing activity) over the period from the start of a transaction to its conclusion. If an executing program suffers an abnormal termination or the transaction is canceled, the pre-update data is used to restore the data updated by the transaction to its state prior to the transaction.

A system deadlock requires the same manner of processing as a transaction cancellation. Traditional applications of this third data backup method have suffered from inefficiency in that they require always storing copies of the source data for the infrequent contingencies of abnormal program termination and transaction cancellation.

A fourth data backup method is provided for data updating errors caused by program errors. This fourth data backup method becomes an issue when a program is not correct. Let us suppose, for example, that 10,000 yen is withdrawn from a bank account with a balance of 100,000 yen but that the resulting balance following the withdrawal is reported as 110,000 yen. In such a case, this fourth data backup method would restore the data to the state of the source data immediately prior to the operation performed by the incorrect program and then repair the data on the basis of the T log by running a correct program.

A fifth data backup method is provided for coping with disasters. The objective of acquiring a backup in this fifth data backup method is to cope with potential disaster. By "disaster" here, we refer to fires, floods, earthquakes and the like. A traditional application of this fifth data backup method would be to make copies of backup files and logfiles and store them in a fireproof safe in order to prevent the loss of files in a disaster of this sort.

A more rigorous application of this method would be to make copies of backup files and logfiles and transfer them to a remote location as a contingency against loss of the operational files.

However, this method suffers from the drawback that since the files thus acquired are copied and forwarded to a remote location, data that is completely identical to copies and logs acquired for the operational files cannot be stored and if the operational files are lost, the update data for a certain period of time will be unavailable.

A sixth data backup method is provided for the destruction of file storage media. This sixth data backup method is a backup technology known as Redundant Array of Inexpensive Disks (RAID), a backup method to provide for the destruction of file storage media.

Applications of this sixth data backup method include storing entirely identical duplicates of files, writing file content segmented to multiple storage devices, and generating parity bits to segment data and write it to a storage device.

From the CPU and software point of view, this data backup method appears to be writing to a single disk device, and the operational files and the backup files are stored on the same device. Therefore, this method suffers the drawback of not providing at all for disasters.

This sixth data backup method suffers from the further drawbacks of being incapable of backing out to handle an on-line abnormal termination and being incapable of restoring data to its state at some earlier point in time.

Since this data backup method also suffers from the flaw of requiring more time than ordinary write operations, it is capable of recovery from the destruction of data only in units of disk volumes and has the disadvantage of taking long periods of time to restore data. In addition, RAID structures must be comprised of devices having equivalent performance characteristics.

A more advanced form of this sixth data backup method employs disk mirroring and allows installation of backup devices at remote locations. When data on the operational disk is updated, the addresses storing updated data and the updated data itself are transmitted to the backup device. Some implementations are equipped with functions that, if required, stop updating the backup system at a given time, restore with the updated data collected on the backup device until the data content is identical to that of the operational device.

This has the advantage of performing real-time backups, but suffers from the following drawbacks. Since mirroring between the operational and backup devices uses hardware addresses on the disk devices, the operational and backup devices must have exactly identical performance and functions. And since it involves the use of hardware addresses, the user is unable to specify whether or not to perform mirroring file by file. Nor is it capable of restoring data to its state at some given time in the past to recover from an error made at that point and update it correctly beyond that point.

A seventh data backup method is to acquire data backups when source data is updated. An application of this seventh data backup method is first to acquire a copy of the entire source data and then basically to acquire A logs. Some applications of this seventh data backup method entail the acquisition of B logs and T logs. Since the A logs grow in volume with data update operations if A logs are merely acquired and stored when the source data is updated successively, it takes an extremely long time to restore data to its original state if the source data is destroyed. To avoid this inconvenience, the A logs are periodically merged with the copies initially acquired, the result being effectively identical to the acquisition of a complete copy of the source data at that point in time. However, since this is in principle no different from the periodic acquisition of a complete copy of the data, this method has suffered from the drawback of requiring considerable time because of the need to restore data to its most recent state with the A logs after first restoring the data acquired with the most recent complete copies when the source data is destroyed.

Drawbacks common to these first through seventh, though not the sixth, data backup methods are the difficulty of creating indexed backups and the time they take to implement. A method called databasing has come into on-line use with traditional file systems. Since these databases have complex formats in which it is possible for multiple indices across several levels to be updated, for example, most such file systems are not subjected to backup. The exceptions either use backup systems that consist of writing index updates to A logs to enable recovery or are complete mirroring implementations.

SUMMARY OF THE INVENTION

Traditional data backup methods have suffered from the drawbacks of requiring large amounts of time to acquire copies of complete files and requiring at least as much time to restore data after files are destroyed as was required for acquiring the copies. This is because traditional data backup methods have adopted systems in which it is necessary to acquire periodically complete copies of the source data, write logs for each transaction made and, when restoring the source data, first return the data to its state when the copies were acquired by restoring from the backup copies and then write the logs to these files to assure the data reflects the most recent transactions. Moreover, since these traditional data backup methods have used magnetic tape devices for the media storing their backup copies, not only do they suffer from the slow operational speed of the devices themselves, but also from the drawback of needing to read data unnecessary to the backup, since the copied files must necessarily be sequential files. This has, of course, been a significant problem in fields in which non-stop operation is taken for granted, but also for more run-of-the-mill systems.

These traditional data backup methods have suffered from the further drawbacks that the time required to acquire copies of the source data grows with the volume of that data and that the costs of acquiring backups are unavoidably large. By "costs" here we refer, in addition to the cost of personnel expenses and backup devices for acquiring copies, to expenses incurred for storage devices to hold the copies and expenses incurred for facilities to hold the storage devices containing the backup data.

The present invention is conceived in view of the drawbacks described above and provides a data backup and recovery system capable of both backup and recovery in short periods of time and at low cost.

To achieve these objectives for a computer data backup and recovery system, the present invention is characterized by a primary system that uses blocks that store sequentially records having one unique key and zero or one or more non-unique keys, manages the locations of these blocks by means of location tables that place them in correspondence with physical addresses in random access memory (RAM) and manages a database stored in RAM, and by one or more secondary systems that provide backup blocks corresponding to the blocks containing the source data on the primary system, manage the locations of these blocks by means of location tables that place them in correspondence with physical addresses in RAM and manage the backup database stored in RAM.

The present invention provides one or more secondary systems whose blocks correspond to those of the primary system in a format logically identical to the source data on the primary system. When the source data is updated, the secondary system updates its backup data and therefore always maintains in its backup files data that is a copy of the most recent source data. A single secondary system will generally suffice, but multiple secondary systems may be provided if necessary. The format of files subjected to backup in the present invention is managed by means of tables called location tables that store records in blocks and manage information about the blocks in order to point to them. Location tables and blocks are used for file storage on the primary system, and the backup blocks of the backup files on the secondary system correspond to the blocks used on the primary system.

The present invention may also provide a data backup and recovery system having a primary system that uses as its random access memory the system memory of the device on which primary system application processing is performed and that has a database control mechanism that modifies the contents of the database in that random access memory and a primary backup and recovery control mechanism that transmits the modified data when the content of the database is modified by the database control mechanism, and one or more secondary systems that use as random access memory the system memory of the devices on which secondary system processing is performed and that have secondary backup and recovery control mechanisms that modify backup databases in that random access memory with the data transmitted by the primary backup and recovery control mechanism.

The present invention may also provide a data backup and recovery system having a primary system comprising a primary system processing device that performs application processing and one or more primary system storage devices having random access memory for database storage apart from the system memory of the primary system processing device, and one or more secondary systems comprising secondary system processing a secondary system processing device that performs the various secondary system processing and one or more secondary system storage devices having random access memory for database storage apart from the system memory of the secondary system processing device.

The present invention may also provide a data backup and recovery system having a primary system comprising, in addition to a primary system processing device and one or more primary system storage devices storing databases independent of the system memory of the primary system processing device, a means of communication for backup data transmissions, a database control mechanism that modifies the content of the database and a primary backup and recovery control mechanism that transmits data describing such modifications via the means of communication when the database control mechanism modifies the database, and one or more secondary systems comprising, in addition to a secondary system processing device and one or more secondary system storage devices storing databases independent of the system memory of the secondary system processing device, a means of communication for backup data transmissions and a secondary backup and recovery control mechanism that modifies the backup database with data transmitted via the means of communication by the primary backup and control mechanism.

The present invention may also provide a data backup and recovery system having a primary system comprising a primary system processing device and one or more primary system storage devices storing databases independent of the system memory of the primary system processing device and one or more secondary systems comprising a secondary system processing device and one or more secondary system storage devices storing databases independent of the system memory of the secondary system processing device in which the primary system processing device and secondary system processing devices are provided only with means of communication for the transmission of backup data between them, the primary storage devices are provided with a database control mechanism that modifies the content of databases and a primary backup and recovery control mechanism that transmits via the means of communication data describing modifications of the database by the database control mechanism, and the secondary system storage devices are provided with a secondary backup and recovery control mechanism that modifies the backup database with the data transmitted via the means of communication by the primary backup and control mechanism.

The present invention may also provide a data backup and recovery system having a primary system comprising a primary system processing device that performs applications processing and one or more primary system storage devices made up of random access memory to store databases apart from the system memory of the primary system processing device, and one or more secondary systems having only one or more secondary system storage devices made up of random access memory to store databases, in which the primary system storage devices are provided with a means of backup data transmission, a database control mechanism that modifies the content of the database and a primary backup and recovery control mechanism that transmits via the means of backup data transmission data describing modifications of the database by the database control mechanism, and in which the secondary system storage devices are provided with a means of backup data transmission and a secondary backup and recovery control mechanism that modifies the backup database with the data transmitted via the means of backup data transmission by the primary backup and recovery control mechanism.

The present invention may also provide a backup and recovery system having a primary system and one or more secondary systems which may or may not use system memory for database storage, one or the other of the primary system and secondary systems classifying transactional log data into post-update data logs, pre-update data logs and update transaction logs and storing one or more of these data logs, as necessary.

The present invention may also provide a backup and recovery system having a primary system and one or more secondary systems, and a synchronous tightly-coupled sequencing system in which the primary system, when it begins processing a transaction, transmits to the secondary systems notification that processing of a transaction has begun and transmits to the secondary systems information specifying the post-update data content, the update content and the blocks where the data is stored, the secondary systems update the backup data affected by that transaction on the basis of information on the post-update data received from the primary system, and the primary system, when it has completed the data update of that transaction, transmits to the secondary systems notification that updating has been completed.

The present invention may also provide a backup and recovery system having a primary system and one or more secondary systems, and an asynchronous loosely-coupled sequencing system in which the primary system transmits to the secondary systems information specifying post-update data content, update content and the blocks where data is stored, and the secondary systems, upon receiving notification from the primary system that a transaction has begun, receive transactional log data from the primary system, update the affected data and, after receiving notification from the primary system that the transaction has been completed, do not transmit to the primary system notification that backup has been completed until all such affected backup data has been updated.

The primary system of the present invention uses blocks that store sequentially records having one unique key and zero or one or more non-unique keys, manages the locations of these blocks by means of location tables that place them in correspondence with physical addresses in RAM and manages a database stored in RAM.

The primary system of the present invention may use the system memory of the primary system processing device that performs application processing as random access memory and is provided with a database control mechanism that modifies the database stored in RAM and a primary backup and recovery control mechanism that transmits data describing modifications made to the database by the database control mechanism when it makes such modifications.

The primary system of the present invention may alternatively be provided with one or more primary system storage devices made up of RAM for database storage that is apart from the system memory of the primary system processing device that performs application processing.

Where the primary system of the present invention is provided with one or more primary system storage devices made up of RAM for database storage independent of the system memory of the primary system processing device, primary system storage devices may be provided with a means of communication for transmitting backup data, a database control mechanism that modifies the database and a primary backup and recovery control mechanism that transmits via the means of communication data describing modifications of the database by the database control mechanism.

Where the primary system of the present invention is provided with one or more primary system storage devices made up of RAM for database storage independent of the system memory of the primary system processing device, the primary system processing device may be provided only with means of communication for transmitting backup data and primary system storage devices provided with a database control mechanism that modifies the database and a primary backup and recovery control mechanism that transmits via the means of communication data describing modifications of the database by the database control mechanism.

Where the primary system of the present invention is provided with one or more primary system storage devices made up of RAM for database storage independent of the system memory of the primary system processing device, the primary system storage devices may be provided with a means of communication for transmitting backup data, a database control mechanism that modifies the database and a primary backup and recovery control mechanism that transmits via the means of communication data describing modifications of the database by the database control mechanism.

The secondary systems of the present invention provide backup blocks corresponding to the blocks containing the source data on the primary system, manage the locations of these blocks by means of location tables that place them in correspondence with physical addresses in RAM, manage the backup database stored in RAM and provided with either the synchronous tightly-coupled sequencing system or the asynchronous loosely-coupled sequencing system described above.

The secondary systems of the present invention may use the system memory of the secondary system processing device as random access memory and are provided with a secondary backup and recovery control system that modifies the backup database in RAM with the data transmitted by the primary system and are provided with either the synchronous tightly-coupled sequencing system or the asynchronous loosely-couple sequencing system described above.

The secondary systems of the present invention are provided with either the synchronous tightly-coupled sequencing system or the asynchronous loosely-coupled sequencing system described above and may alternatively be provided with one or more secondary system storage devices made up of RAM for database storage that is apart from the system memory of the secondary system processing device that performs application processing.

Where a secondary system of the present invention is provided with one or more secondary system storage devices made up of RAM for database storage independent of the system memory of the secondary system processing device, it may be provided with a means of communication for backup data transmissions, a secondary backup and recovery control mechanism that modifies the backup database with data transmitted via the means of communication by the primary backup and control mechanism, and either the synchronous tightly-coupled sequencing system or the asynchronous loosely-coupled sequencing system described above.

Where a secondary system of the present invention is provided with one or more secondary system storage devices made up of RAM for database storage independent of the system memory of the secondary system processing device, the secondary system processing device may be provided, in addition to either the synchronous tightly-coupled sequencing system or the asynchronous loosely-coupled sequencing system described above, only with means of communication for backup data transmissions and secondary system storage devices provided with a secondary backup and recovery control mechanism that modifies the backup database with data transmitted via the means of communication by the primary backup and control mechanism.

The secondary system of the present invention may be provided with one or more secondary system storage devices made up of RAM for database storage, which secondary system storage devices may be provided with a means of backup data transmission and a secondary backup and recovery control mechanism that modifies the backup database with data transmitted via the means of communication by the primary backup and control mechanism, and with either the synchronous tightly-coupled sequencing system or the asynchronous loosely-coupled sequencing system described above.

Either the primary system or the secondary systems of the present invention may classify transactional log data into post-update data logs, pre-update data logs and update transaction logs and storing one or more of these data logs, as necessary.

The primary system and secondary systems of the present invention may be provided with either a synchronous tightly-coupled sequencing system or an asynchronous loosely-coupled sequencing system.

OBJECTS AND ADVANTAGES

Accordingly, several objects and advantages are:
(a) To reduce greatly the time and trouble entailed by backups;
(b) Likewise, to reduce greatly the time and trouble entailed by recovery using backup data;
(c) To provide certainty of backups and of recovery using backup data;
(d) To reduce recovery time by enabling certain and simple indexed backups;
(e) To achieve uninterrupted operation by switching to a secondary system when the primary system fails; and
(f) To eliminate the necessity for a backup device to be of the same format as the primary system.

BRIEF DESCRIPTION OF THE DRAWINGS

FIG. 5 illustrates the sequence of operations performed by the data backup and recovery system from the beginning to the end of a single transaction in the first of the preferred embodiments of the present invention.

Figure 1:
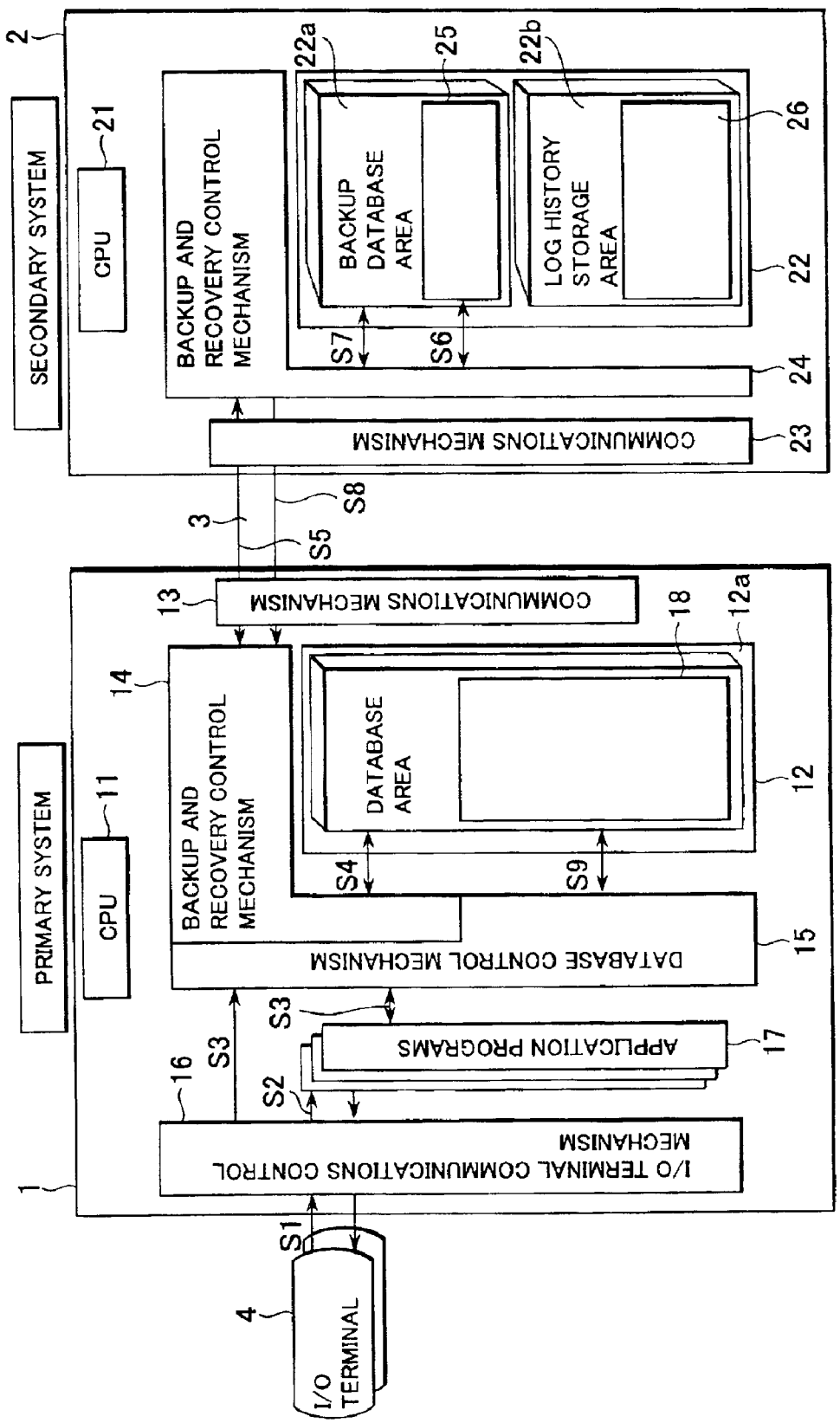
FIG. 1 is a block diagram of a configuration of a primary system and secondary system implementing a backup and recovery system that is a preferred embodiment of the present invention.

REFERENCE NUMERALS IN DRAWINGS 1, 1a, 1b primary system
2, 2a, 2b secondary system
3 communications network
4 input-output terminal
5 primary location table
6, 6a, 6b, 6c, . . . primary blocks
7 secondary location table
8, 8a, 8b, 8c, . . . backup blocks
9 overflow blocks
11, 21 central processing unit
12, 22 random access memory
12a database area
12b program area
13, 23 communications mechanism
14 backup and recovery control mechanism
15 database control mechanism
16 input-output terminal communications control mechanism
17 application programs
18 database
19 bus line
22a backup database area
22b log history storage area
22c program area
24 backup and recovery control mechanism
25 backup database
26 log history data
29 bus line
51, 51a, 51b, 51c block numbers
52, 52a, 52b, 52c physical addresses
61 physical addresses
62 primary key value
63 overflow key value
64 records
641 primary key
642 alternate keys
643 data
65 overflow block address
71, 71a, 71b, 71c block numbers
72, 72a, 72b, 72c physical addresses

DESCRIPTION OF THE PREFERRED EMBODIMENTS

The description following of the preferred embodiments of the present invention of a data backup and recovery system makes reference to the drawings. The present invention implements an information storage and retrieval system (JP Kokai publication no. H11-31096 [1999]), and the description following thus has cause in part to incorporate a description of this information storage and retrieval system.

The terms table, file and database, as used herein, are defined as follows. Table and file are synonymous. The term "table" takes a logical view, and the term "file" a physical view of the same data structure. A database is an aggregate of files. Whereas a single file is an aggregate of blocks in which records are stored, a single database is comprised of, in addition to these, a combination of location tables (files) and alternate key tables (files).

FIG. 1 is a block diagram of a configuration of a primary system and secondary system implementing a backup and recovery system of the present invention.

In addition to the capability of utilizing specific regions of the memory devices of conventional main computer memory for backup purposes, the present invention may also be implemented with backup memory devices alone as a substitute for conventional hard disk devices. FIG. 1 describes a configuration that uses specific regions of conventional main computer memory as its backup storage device.

This backup and recovery system of FIG. 1 comprises a primary system 1 on a computer and a secondary system 2 also on a computer. Primary system 1 here is an array of storage devices (memory) that operates first in the updating of data. Secondary system 2 is the system that acquires backups of the data. In order to minimize the damage of storage device (memory) failure, both primary system 1 and secondary system 2 should store their data segmented across multiple storage devices (memory) rather than a single storage device. Storing data in this manner also makes it possible to prepare for damage with fewer storage devices (memory). The primary system 1 and secondary system 2 are connected via a network communications device 3, and the two systems may exchange data between themselves.

The primary system 1 is made up of a central processing unit (CPU) 11, random access memory (RAM) 12 of which specific regions are used as the backup storage device while the RAM also serves as the main computer memory, a communications mechanism 13, a primary backup and recovery control mechanism 14, a database control mechanism 15, an input-output terminal communications control mechanism 16, application programs 17 and other means unillustrated. A database area 12a is provided in RAM 12 for storage of the databases 18. Here RAM 12 may be a semiconductor storage device, for example, or any other means of accessing memory randomly. An input-output (I/O) terminal 4 is also connected to primary system 1 via the input-output (I/O) terminal communications control mechanism 16.

The secondary system 2 is made up of a CPU 21, RAM 22, a communications mechanism 23, a backup and recovery control mechanism 24 and other means unillustrated. The RAM 22 is made up of a backup database area 22a holding the backup databases 25, a log history storage area 22b holding log history data 26 and other memory areas not illustrated. Here RAM 22 may be a semiconductor storage device, for example, or any other means of accessing memory randomly. A given implementation of the present invention may be provided with multiple secondary systems 2, but for the sake of simplicity the initial description of its preferred embodiments will restrict itself to a single secondary system 2.

Primary system 1 and secondary system 2 communicate by means of signals. Data input at the I/O terminal 4 is sent (S1) to the I/O terminal communications control mechanism 16. In the I/O terminal communications control mechanism 16, this data is received (S2) by applications 17. The applications 17 then execute a series of database manipulation commands and transmit (S3) the data thus received (T log) to the database control mechanism 15. The data is simultaneously transmitted (S3) from the I/O terminal communications control mechanism 16 to the primary backup and recovery control mechanism 14.

As many files as are needed may be created on primary system 1 here; no restriction is placed on the number of files created. While this description presumes on-line processing, the same logic may apply to batch processing if it handles data in units of transactions. The database control mechanism 15 updates (S4) the corresponding database 18. Acting on these instructions, the primary backup and recovery control mechanism 14 transmits (S5) the log data to the secondary system 2 via the communications mechanism 13 and the network communications device 3.

On the secondary system 2, the various log data received is stored (S6) in memory as log history data 26 by means of the backup and recovery control mechanism 24. In addition, the log data is used to update (S7) the backup database 25 by means of the backup and recovery control mechanism 24. The secondary system 2 also reports (S8) to the primary system 1 via communications mechanism 13 and the communications network 3 that backup has been completed. The pertinent locked records of the applications 17 are then unlocked (S9) by the primary backup and recovery control mechanism 14 on the primary system 1. Thus, as described above, the primary system 1 and the primary system 2 operate, and the backup databases 25 on the secondary system 2 are updated when the databases 18 on the primary system 1 are updated.

The devices provided to implement this data backup and recovery system include one array of storage devices (memory) provided for active use and one or more array of storage devices (memory) independent of and with an access speed equivalent to the active array provided for backup use. Each storage device (memory) is connected to a processing device and performs reads, writes, updates and deletions when so instructed by the processing device. Each storage device (memory) should have its own, independent processing device. A single array of storage devices (memory) would consist of multiple storage devices (memory) when the volume of entire files is so large that files cannot fit on a single storage device (memory) and so are stored across multiple storage devices (memory) and when it is necessary to store files on multiple storage devices (memory), as when localizing damage caused by performance problems or failure. The primary system 1 would be implemented with a single array of storage devices (memory), and the secondary systems 2 would each be implemented with single arrays of the remaining storage devices (memory) to construct a system such as that illustrated in FIG. 2.

Figure 2:
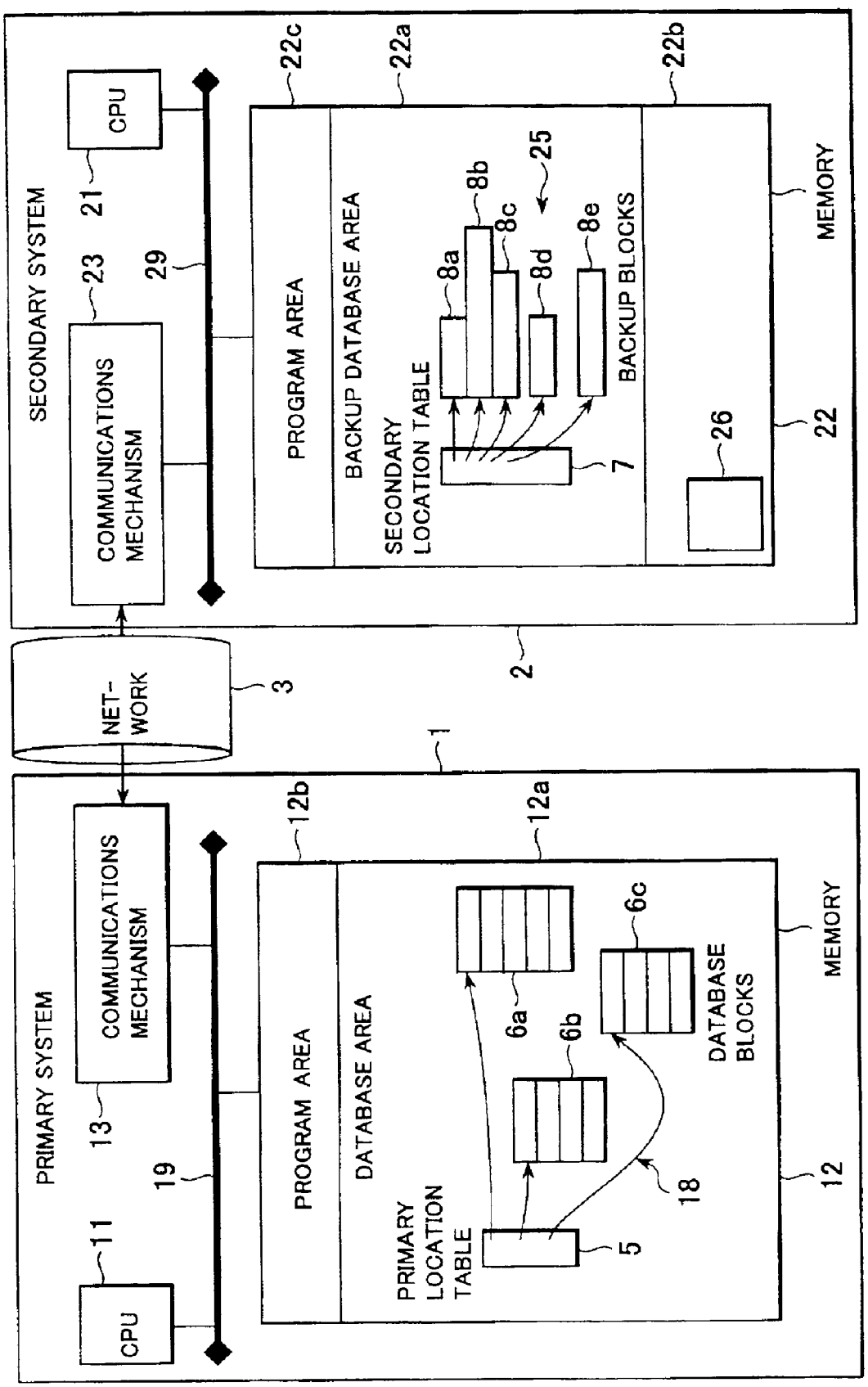
FIG. 2 is a block diagram depicting in further detail a configuration of a primary system and secondary system implementing a backup and recovery system that is a preferred embodiment of the present invention.

FIG. 2 is a block diagram depicting in further detail a configuration of a primary system and secondary system. In FIG. 2, the primary system 1 is comprised of a CPU 11, RAM 12 and a communications mechanism 13 connected by a bus line 19. The RAM 12 is comprised of a database area 12a and a program read area 12b. The databases 18 are stored in the database area 12a. The databases 18 each contain a primary location table 5 and primary blocks 6a, 6b, 6c, . . . 6n.

The secondary system 2 is made up of a CPU 21, RAM 22 and a communications mechanism 23 connected by a bus line 29. The RAM 22 is comprised of a backup database area 22a, a log history storage area 22b and a program read area 22c. The backup database area 22a contains a secondary location table 7 and backup blocks 8a, 8b, 8c, . . . 8n. The log history storage area 22b contains log history data 26. The secondary location table 7 and the backup blocks 8a, 8b, 8c, . . . 8n in the secondary system 2 correspond to the primary location table 5 and the primary blocks 6a, 6b, 6c, . . . 6n in the primary system 1. Although the primary location table 5 and the primary blocks 6a, 6b, 6c, . . . 6n in the primary system 1 illustrated in FIG. 2 make up only a single database, multiple databases would generally exist on such a system: for example, a personnel management database, a salaries database, an inventory control database and a customer management database.

Figure 3:
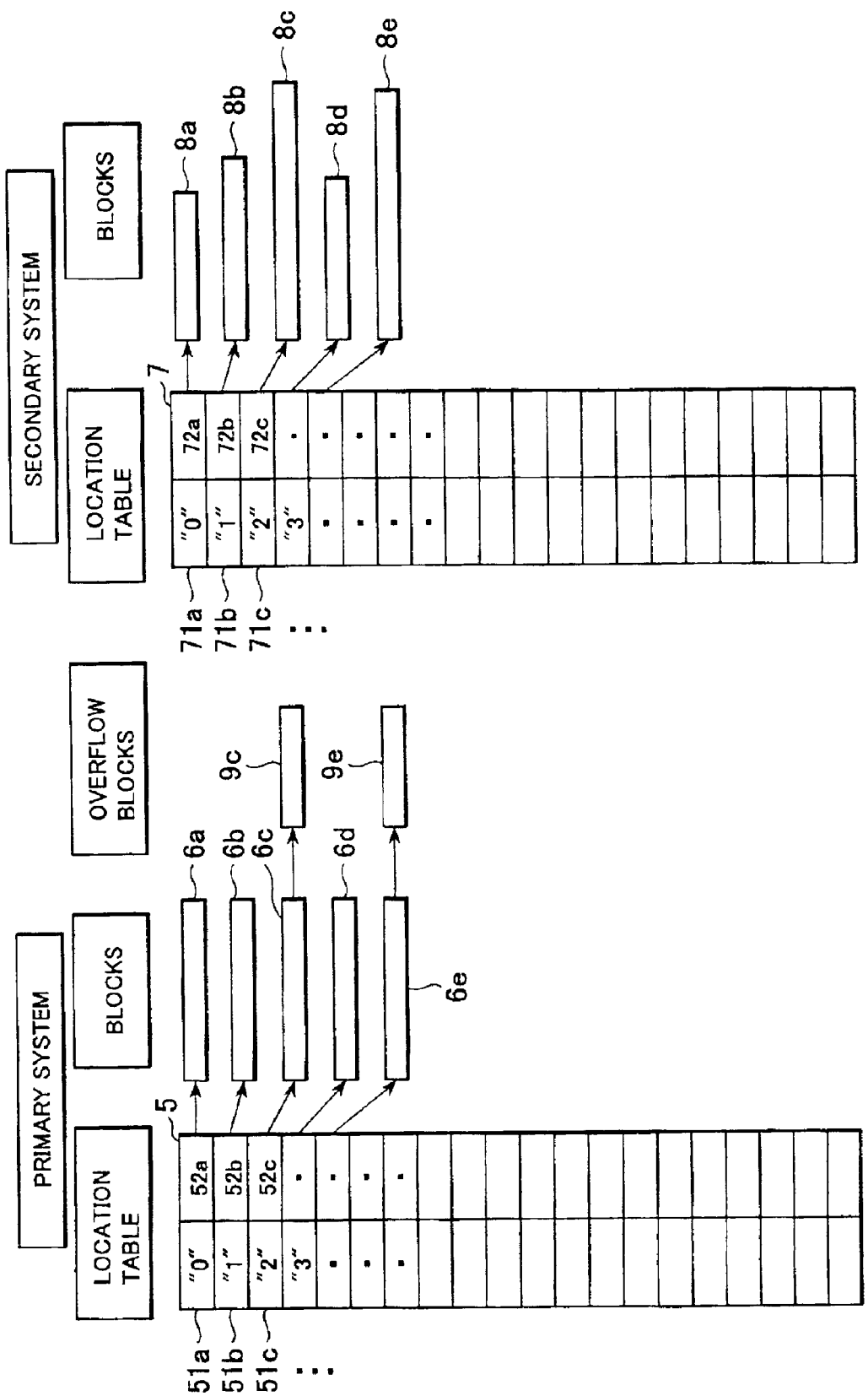
FIG. 3 illustrates the location tables and database blocks used by the primary system and secondary system in the first of the preferred embodiments of the present invention.

FIG. 3 illustrates the location tables and database blocks used by the primary system and secondary system. In primary location table 5 used in the primary system 1, block numbers 51a, 51b, 51c, . . . 51n are assigned to block 0, block 1, block 2, block 3, . . . block n from the top down, and the blocks are stored severally at physical addresses 52a, 52b, 52c, . . . 52n in RAM 12 corresponding to the block numbers 51a, 51b, 51c, . . . 51n. The primary blocks 6a, 6b, 6c, . . . 6n corresponding to the block numbers 51a, 51b, 51c, . . . 51n registered in the primary location table 5 are located and stored in database storage area 12a in RAM 12 corresponding to the physical addresses 52a, 52b, 52c, 52n pointed to by the primary location table 5.

FIG. 3 shows overflow blocks 9c and 9e appended to the primary blocks 6c and 6e, respectively. The primary location table 5 and the secondary location table 7 need not have physically identical content; it shall suffice if they have logically identical content.

As in the location table 5 used in the primary system 1, in the secondary location table 7 used in the secondary system 2, block numbers 71a, 71b, 71c, . . . 71n are assigned to block 0, block 1, block 2, block 3, . . . block n from the top down, and the blocks are stored severally at physical addresses 72a, 72b, 72c, . . . 72n in RAM 12 corresponding to the block numbers 71a, 71b, 71c, . . 71n.

The backup blocks 8a, 8b, 8c, . . . 8n corresponding to the block numbers 71a, 71b, 71c, . . . 71n registered in the secondary location table 7 are located and stored in RAM 22 at the physical addresses 72a, 72b, 72c, . . . 72n pointed to by the secondary location table 7.

Figure 4A:
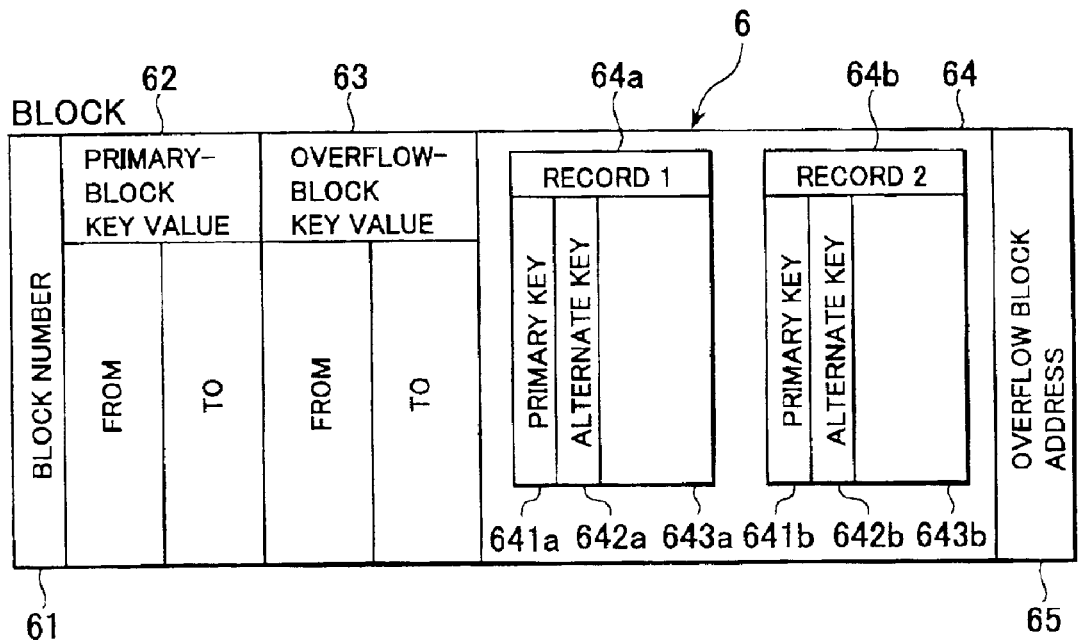
FIG. 4 illustrates the structure of the blocks used by the primary system in the first of the preferred embodiments of the present invention.
Figure 4B:
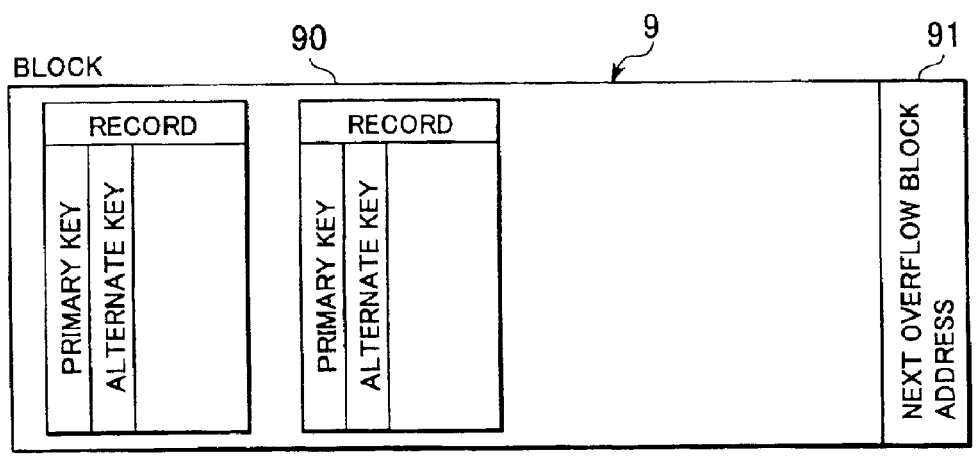
Figure 4C:
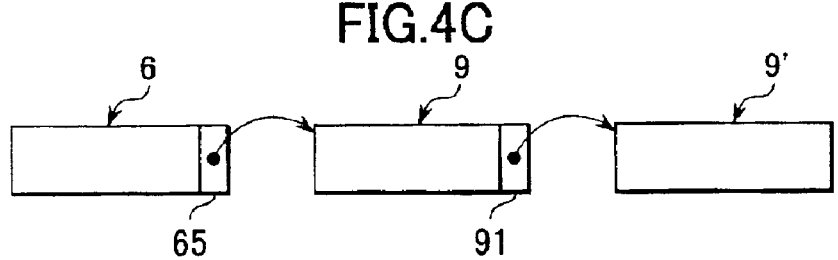

The description following of how data is stored in the database of the primary system makes reference to FIG. 4, which illustrates the structure of the blocks used by the primary system.

These blocks may be classified into primary blocks 6 and overflow blocks 9. A primary block 6 is comprised of a block number 61, a primary key value 62, an overflow key value 63, records 64a, 64b, . . . 64n, and an overflow block address 65. The primary key value 62 is provided with FROM and TO values that represent the minimum and maximum values, respectively, of the key values contained in the block 6. Likewise, the overflow key value 63 is provided with FROM and TO values that represent the minimum and maximum values, respectively, of the key values contained in the overflow blocks. While FROM and TO values have here been provided to both primary key value 62 and overflow key value 63, a single pair of FROM and TO values may alternatively be provided to the primary and overflow key values together.

The overflow blocks 9 are used when the record 64 cannot be stored in a primary block 6 alone. The overflow blocks 9 are managed as subordinate blocks of the primary block 6, are pointed to only from the primary block 6 and are not managed in the location table 5. When a single overflow block is insufficient, additional overflow blocks are added one by one. In such cases, an overflow block address 91 is used to indicate the position, relative to some overflow block n, of overflow block n+1. Records 90 are maintained within overflow blocks, as they are within primary blocks. As illustrated in FIG. 4, the record 64 used in the primary system 1 has a structure comprising a single unique key (one that does not duplicate the key value of another record, referred to below as the "primary key") 641, zero or one or more non-unique keys (ones that may duplicate the key values of other records, referred to below as the "alternate keys") 642 and data 643 in its data record. Codes a, b, c, . . . n are appended to individual instances of the record 64 to distinguish them from each other. When data is input, the database control mechanism 15 of the primary system 1 stores one or more instances of the record 64 having in its data record the single unique primary key 641, alternate keys 642 and data 643 in the fixed-length block 6 in order from the primary key 641 onward. The record 64 is first of all stored in the primary block 6 by the database control mechanism 15. When it becomes no longer possible to store data in a primary block 6 due to the insertion of records 64a, 64b, . . . 64n, an overflow block 9 is assigned to the primary block 6, a further overflow block 9' is assigned when it is no longer possible to store data in the first overflow block 9, and the blocks 6, 9 and 9' then jointly store records 64a, 64b, . . . 64n as a block.

When data cannot be stored in the final primary block 6 due to the additions of records 64a, 64b, . . . 64n, the database control mechanism 15 assigns a new primary block 6 to store the new data. The location table 5 is used to control the locations of the blocks 6a, 6b, 6c, . . . 6n, which may be located with no restriction whatsoever on their physical location. Nor need the blocks 6a, 6b, 6c, . . . 6n be created in advance; they may be created as needed and may be created until the data storage area is physically full. This system further prevents the generation of overflow records by segmenting files into which multiple records are inserted across multiple subranges at the location where they are inserted after multiple specific primary keys by treating them as added, rather than inserted, records.

The description following of how the data backup and recovery system of the present invention operates makes reference to FIG. 5, based on FIGS. 1 through 4. FIG. 5 illustrates the sequence of operations performed by the data backup and recovery system from the beginning to the end of a single transaction.

References in this description to data updates include data additions and deletions, and refer to all operations that effect change on the file in question. The term "transaction" refers to a series of operations involving a computer system. For example, the series of operations by which a bank customer makes a withdrawal from his account would constitute a transaction. To apply the system of the present invention, first a complete copy of the source data would be made, once only, from the primary system 1 storing the source data on the secondary system 2 storing the backup database 25. On the primary system 1, data is stored in the blocks 6 and each instance of block 6 has a sequential block number 61; likewise, on the secondary system 2, backup blocks 8a, 8b, 8c, . . . 8n are provided in one-to-one correspondence with the primary system 1 and the data stored in them. The secondary location table 7 is provided to manage the backup blocks 8a, 8b, 8c, . . . 8n.

When these initial preparations have been completed, a data processing system made up of the primary system 1, the I/O terminal 4 and other members, as needed, is set in operation. The database control mechanism 15 of the primary system 1 reports (S101) the initiation of a transaction and transmits (S102) data $T_1$. The data processing system processes the data and when the source data is updated (S103), the backup and recovery control mechanism 14 of the primary system 1 transmits (S104) the post-update data (A log [A1]) to the secondary system 2, along with the B log (B1) and the unillustrated T log if these are required. It is useful to store these logs on the primary system for when it becomes necessary to use them.

When the data $T_1$ is received (S201), the backup and recovery control mechanism 24 of the secondary system 2 stores it (S202) in the log history 26. Next, when the A log (A1) is received (S203), the backup and recovery control mechanism 24 of the secondary system 2 retrieves the backup blocks 8a, 8b, 8c, . . . 8n in the backup database 25 to store this data. To do so, it should retrieve the backup blocks 8a, 8b, 8c, . . . 8n that have the same numbers as the block numbers 61 of blocks 6 in the primary system 1. The backup and recovery control mechanism 24 retrieves the applicable data in the backup blocks 8a, 8b, 8c, . . . 8n and overwrites it (S204) with the A log (A1). The backup and recovery control mechanism 24 also stores the B log (B1) in the log history data 26. Thus are the data on primary system 1 and secondary system 2 constantly maintained in an identical state, and it is possible to cope with damage to the primary system.

When the data processing system again processes data and an addition is made (S105) to the source data, the backup and recovery control mechanism 14 of the primary system 1 transmits (S106) the additional data (A log [A2]) to the secondary system 2. When the A log (A2) is received (S206), the backup and recovery control mechanism 24 of the secondary system 2 retrieves backup blocks 8a, 8b, 8c, . . . 8n having the same numbers as the block numbers 61 of the blocks 6 on the primary system 1 and stores (S207) the data in the applicable blocks 8. Thus are the data on primary system 1 and secondary system 2 constantly maintained in an identical state, and it is possible to cope with damage to the primary system.

When data is further processed by the data processing system and a deletion is made (S107) from the source data, the backup and recovery control mechanism 14 of the primary system 1 transmits (S108) the deleted data (log A [A3]) and log B ([B3]) to the secondary system 2. When the log A (A3) and log B (B3) are received (S209), the backup and recovery control mechanism 24 of the secondary system 2 retrieves backup blocks 8a, 8b, 8c, . . . 8n having the same numbers as the block numbers 61 of the blocks 6 on the primary system 1 and deletes (S210) the data from the applicable blocks 8. The backup and recovery control mechanism 24 also stores (S211) the deleted data (log A [A3] and log B [B3]) in the log history data 26. Thus are the data on primary system 1 and secondary system 2 constantly maintained in an identical state, and it is possible to cope with damage to the primary system. When a given series of such operations is completed, the backup and recovery control mechanism 14 of primary system 1 transmits (S109) to the secondary system 2 a report that the transaction has been completed.

When the secondary system 2 receives (S212) the message that the transaction has been completed, the backup and recovery control mechanism 24 completes a full update of the data involved in the transaction in question and then immediately transmits (S213) to the primary system 1 a message that the backup has been completed. The backup and recovery control system 14 of primary system 1 then unlock (S110) the pertinent locked data.

The short description following addresses the functions of the B log and T log. By acquiring sequential B logs in the log history data 26 as described above, it becomes possible to restore the primary system 1 to earlier states extant within some defined period of time previous. This is effected by applying the most recent B logs sequentially in reverse order of their acquisition to return the file to its state at some earlier point in time. This makes it possible to make effective use of non-updated data that was used only at the time of abnormal program execution.

The acquisition of sequential T logs in the log history data 26 makes it possible to restore the correct content of data when program error results in incorrectly updated data by using the B logs to restore the data to some earlier state and then running correct programs on the T logs. The periods of time for which B logs and T logs are stored may be defined individually as periods of time required by the specific implementation.

Thus file backups are continuously maintained on the secondary system 2 and, although there is no need to copy these logs to other media, it is not inconsistent with the object of the present invention to acquire copies of the files at some given point. Since the storage structure used on the primary system 1 is simple and since it can easily be regenerated from the log data in a short time, there is no need to backup the files, but if an implementation of this system encompasses backup of the files, these backups may be acquired in the same format as the source data.

Backup data stored in the backup database 25 on the secondary system 2 may be stored uncompressed and, if so, the data may be written to the database as is, but the description following adopts compression for storing the data.

On the primary system 1, data is stored uncompressed in fixed-length primary blocks 6 and, when necessary, in overflow blocks 9. (See FIG. 3 and FIG. 4c.) When necessary, further overflow blocks 9' are created. (See FIG. 3 and FIG. 4c.)

On the secondary system 2, the location table 5 is provided, in a size matching the amount of entries on the primary system 1. Compression of records on the secondary system 2 reduces the amount of memory required. The block lengths of the backup blocks 8a, 8b, 8c, . . . 8n will vary, as illustrated in FIG. 2 and FIG. 3. Therefore, the backup blocks 8a, 8b, 8c, . . . 8n are variable-length blocks, and when a primary block 6 on the primary system 1 has an overflow block 9, the entire record, including the overflow block 9, is backed up to a single backup block, as 8c or 8e.

However, in implementations in which data on the secondary system 2 is not compressed, data may be backed up in the format of a primary block 6 and overflow block 9, as on the primary system 1.

The backup blocks 8 are managed with the secondary location table 7. To retrieve a specific backup block 8a, 8b, 8c, . . . 8n, the backup and recovery control mechanism 24 of the secondary system 2 accesses the secondary location table 7 to retrieve the address of the specific backup block 8a, 8b, 8c, . . . 8n.

There is no need to back up the alternate key table of the primary system 1 since it is easily restored, but if high-speed recovery is desired, it may be maintained on the secondary system 2.

The description following relates to backing up alternate key tables. A method for storing alternate key tables is described in JP Kokai publication no. H11-31096 (1999) and is illustrated in FIG. 10. A secondary alternate key table of exactly the same size and format of that on the primary system is provided on the secondary system. This is a file made up of sets of blocks, in which each block is assigned a block number. When the content of the primary alternate key table is updated, the primary system acquires the B log containing the pre-update data and then transmits the A log containing a description of the post-update data to the secondary system, following the same procedures as when a primary block is updated. The secondary system uses the information in the A log to update the secondary alternate key table. Since blocks are assigned block numbers in the alternate key table, block numbers should be included in the A log. The secondary system uses the block numbers to look blocks up in the secondary alternate key table and update the blocks affected.

In a system that also makes use of pre-alternate key tables, pre-alternate key tables would also be created on the secondary system in the same format as on the primary system.

The description following relates to the performance of data updates. On-line data processing is performed continuously on the primary system 1, and data updates are performed directly on the primary system 1. Sequencing of data transmissions between the primary system 1 and the secondary system 2 may be either synchronous tightly-coupled or asynchronous loosely-coupled.

Synchronous tightly-coupled transmission synchronizes backups by the secondary system 2 with updates on the primary system 1 and assumes that the secondary system 2 and the primary system 1 are coupled by a nearby means of high-speed transmission.

Asynchronous loosely-coupled transmission assumes that the secondary system 2 is located some distance from the primary system 1, primarily in order to cope with a disaster, and that they are connected via telecommunications lines.

Figure 6:
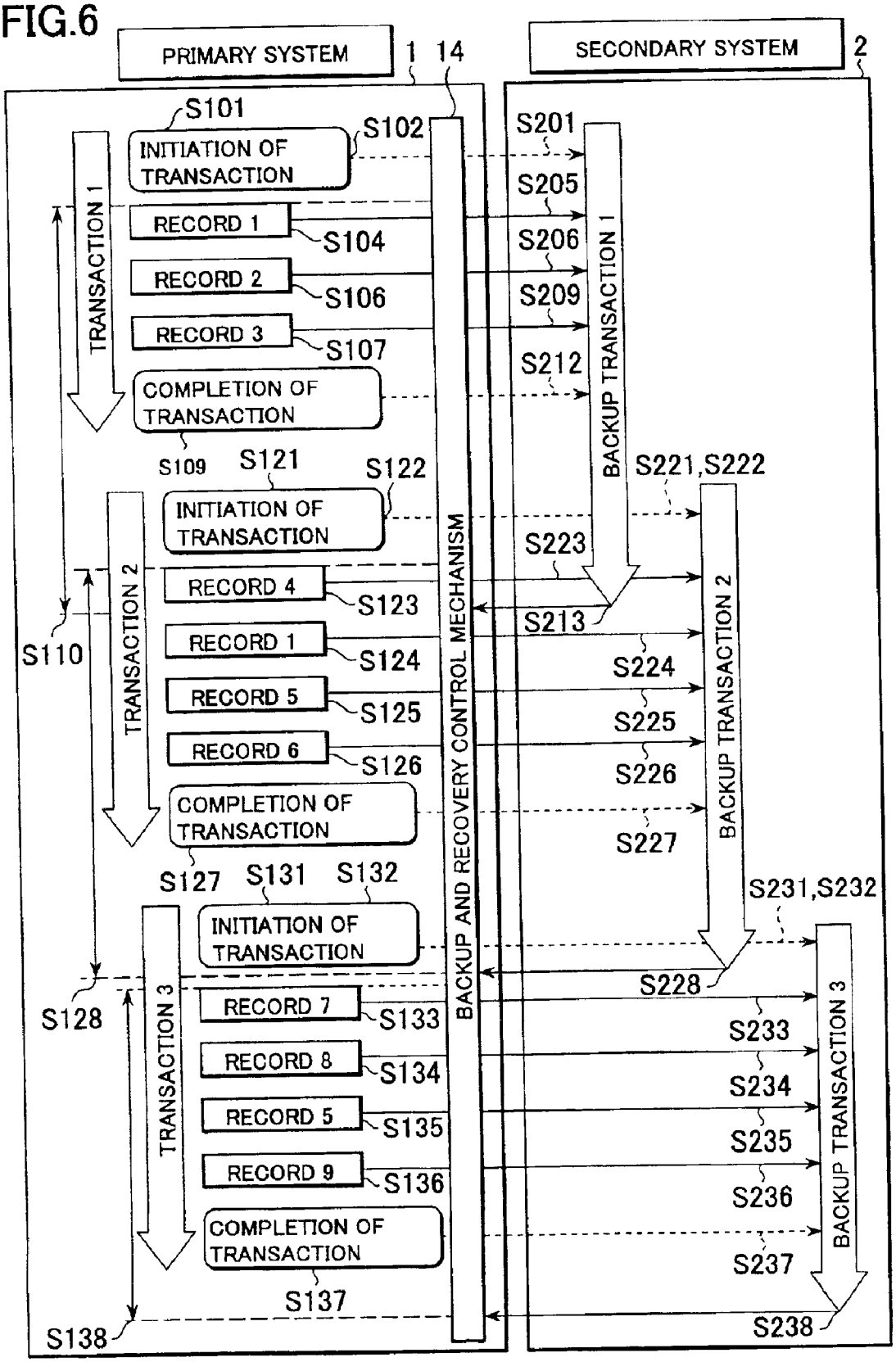
FIG. 6 illustrates the operation of a synchronous tightly-coupled data backup and recovery system in the first of the preferred embodiments of the present invention.

The description following of using synchronous tightly-coupled transmission makes reference to FIG. 5 and FIG. 6, based on FIGS. 1 through 4. FIG. 6 illustrates the operation of a synchronous tightly-coupled data backup and recovery system.

When the processing of a transaction is initiated (S101 in FIGS. 5 and 6) on the primary system 1, the primary system 1 transmits (S102 in FIGS. 5 and 6) to the secondary system 2 a message that a transaction has been initiated. This message includes information that specifies the transaction. This message transmits a transaction number.

After the transaction has been initiated, if any updating (including additions and deletions) is performed on the data, the data update is performed directly in the applicable database 18 in the RAM 12 of the primary system 1. In addition to the content of the post-update data (A log), the nature of the update (differentiating among updates, additions and deletions) and file identification, the message should also include the number of the block where the data is stored and the leading address of the record in the block. The transmission of this data speeds up the reading of the locations written to on the secondary system 2. The term "file identification" refers to a means of identifying the updated file on a single system where multiple files are present and it would not be possible to execute the processing without the knowledge of which file was updated.

The backup and recovery control mechanism 14 of the primary system 1 transmits (S104, S106, S107 and S108 in FIGS. 5 and 6) to secondary system 2 this information, with a transaction number and information, such as a transmission time stamp, allowing strict discrimination of the data sequence attached.

To provide for the cancellation of a transaction, the content of the source data prior to update (B log) is acquired on the primary system 1 before the data is updated. The B log may be transmitted to the secondary system 2 if necessary, but it need not be. Among the advantages of transmitting it to the secondary system 2 are that maintaining the B logs on secondary system 2 as well reduces the danger that logs may be lost and that subsequent operations on the secondary system 2 will be speeded up in the event of a canceled transaction.

When post-update data (A log) information arrives, the secondary system 2 immediately updates (S204, S207 and S210 in FIG. 5) the data affected on the basis of the post-update data information for the applicable transaction. References here to updating data refer to the rewriting of the affected data by replacing it with the content given in the post-update data information. The content may be stored in compressed form.

The description following is of the action performed on a transaction 2. When transaction processing is again initiated (S121 in FIG. 6) on the primary system 1, the primary system 1 transmits (S122 in FIG. 6) to the secondary system 2 a message that a transaction has been initiated. After the transaction has been initiated, if any updating (including additions and deletions) is performed on the data, the data update is performed directly in the applicable database 18 in the RAM 12 of the primary system 1. The backup and recovery control mechanism 14 of the primary system 1 transmits (S123, S124, S125 and S126 in FIG. 6) to the secondary system 2 this information, with a transaction number and information, such as a transmission time stamp, allowing strict discrimination of the data sequence attached, as post-update data information. When post-update data information arrives, the secondary system 2 immediately updates (S223, S224, S225 and S226 in FIG. 6) the data affected on the basis of the post-update data information for the applicable transaction. When data is updated, it is locked on the primary system 1 to prevent further update, but when the message arrives from the secondary system 2 that the backup has been completed, it is then unlocked (S128 in FIG. 6).

Therefore, after a transaction has been completed (S127 in FIG. 6) on the primary system 1, there is no need to wait for the message that backup has been completed to arrive (S128 in FIG. 6) from the secondary system 2 before initiating (S131 in FIG. 6) the next transaction. If a data update is required, since data is in an exclusive wait state from the moment it is locked, there is no possibility of performing a second update on it on the primary system 1 before the updating of the backup data is completed on the secondary system 2.

Consider how data is unlocked when multiple secondary systems 2 are present. When multiple secondary systems 2 are present and the emphasis is on data integrity, the primary system 1 waits for messages that backup has been completed from all secondary systems 2 before unlocking the affected data, but when the emphasis is on high-speed operation, the primary system 1 may unlock the affected data when it has received messages that backup has been completed from one or two or more secondary systems 2 that are fewer than the total number of secondary systems 2.

The description following is of the action performed on a transaction 3. When transaction processing is again initiated (S123 in FIG. 6) on the primary system 1, the primary system 1 transmits (S132 in FIG. 6) to the secondary system 2 a message that a transaction has been initiated. After the transaction has been initiated, if any updating (including additions and deletions) is performed on the data, the data update is performed directly in the applicable database 18 in the RAM 12 of the primary system 1. The backup and recovery control mechanism 14 of the primary system 1 transmits (S133, S134, S135 and S136 in FIG. 6) to the secondary system 2 this information, with a transaction number and information, such as a transmission time stamp, allowing strict discrimination of the data sequence attached, as post-update data information. When post-update data information arrives, the secondary system 2 immediately updates (S233, S234, S235 and S236 in FIG. 6) the data affected on the basis of the post-update data information for the applicable transaction.

When data is updated, it is locked on the primary system 1 to prevent further update, but when the message arrives from the secondary system 2 that the backup has been completed, it is then unlocked (S138 in FIG. 6).

Therefore, after a transaction has been completed (S127 in FIG. 6) on the primary system 1, there is no need to wait for of the message that backup has been completed to arrive (S128 in FIG. 6) from the secondary system 2 before initiating (S131 in FIG. 6) the next transaction. If a data update is required, since data is in an exclusive wait state from the moment it is locked, there is no possibility of performing a second update on it on the primary system 1 before the updating of the backup data is completed on the secondary system 2. Data backup and recovery is enabled by performing successive processing, as of transactions and data updates, in this way.

In the case described above, logs are acquired as follows. The post-update information is used as is for the B log. B logs are needed when restoring the source data to its state at some given previous time. The update data transmitted is used as is for the T log. T logs are needed when program error requires that processing be done over again. B logs and T logs may be maintained on the primary system 1, but in applications of the present invention in which B logs and T logs are also backed up, they are transmitted to the secondary system 2 and maintained there.

Whereas the foregoing description is of backup of data blocks, the following description is of backup of location tables and alternate key tables.

The primary location table 5 of the primary system 1 is modified with the addition of a primary block 6 occasioned by the addition of data. When a backup block 8 is added with the addition of the data on the secondary system 2, a backup block 8 is likewise added on the secondary system 2 as well. Since this event also automatically causes the generation of a secondary location table 7 on the secondary system 2, a direct backup is unnecessary. Although a backup of the alternate key table is not essential, it should be made subject to backup for purposes of achieving high-speed recovery.

The alternate key table performs modifications of data in the alternate key blocks and additions of alternate-key overflow blocks. When these actions are performed, the block storing the alternate key table is transmitted from the primary system 1 to the secondary system 2. The affected alternate key block is updated as is on the secondary system 2. The affected alternate key block should be detected either with the offset from the beginning of the alternate key table or by assigning a number to the alternate key block and using that to detect it, but it may also be detected by using the alternate key.

Figure 7:
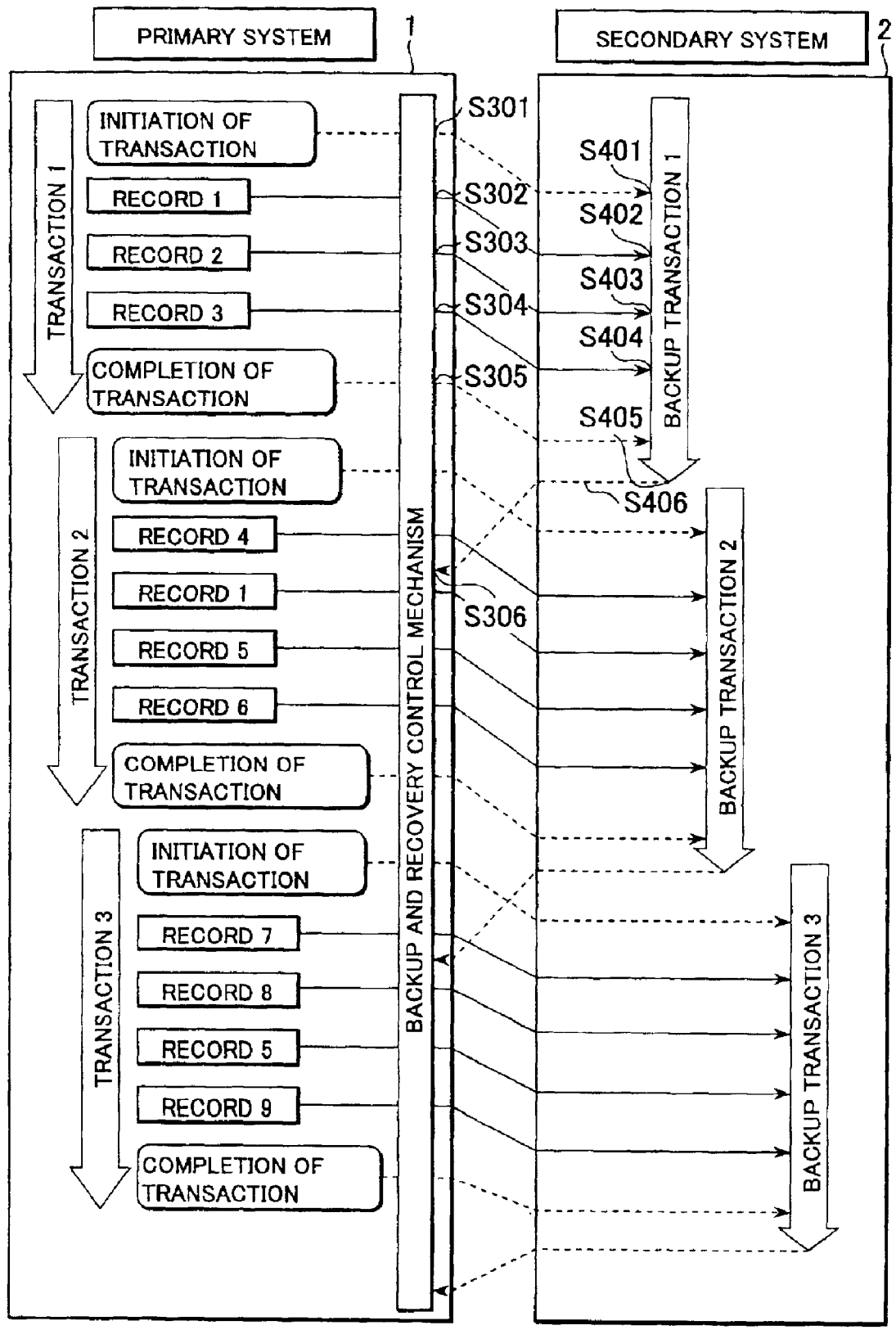
FIG. 7 illustrates the operation of an asynchronous loosely-coupled data backup and recovery system in the first of the preferred embodiments of the present invention.

The description following of using asynchronous loosely-coupled transmission makes reference to FIG. 7, based on FIGS. 1 through 3. FIG. 7 illustrates the operation of an asynchronous loosely-coupled data backup and recovery system.

When the processing of a transaction is initiated on the primary system 1, as with synchronous tightly-coupled transmission, the primary system 1 transmits (S301 in FIG. 7) to the secondary system 2 a message that a transaction has been initiated. This message includes information that specifies the transaction. This message transmits a transaction number. After the transaction has been initiated, if any updating (including additions and deletions) is performed on the data, the data update is performed directly in the applicable database 18 in the RAM 12 of the primary system 1. In addition to the content of the post-update data (A log), the nature of the update (differentiating among updates, additions and deletions) and file identification, the message should also include the number of the block where the data is stored and the leading address of the record in the block. The transmission of this data speeds up the reading of the locations written to on the secondary system 2. The term "file identification" refers, as above, to a means of identifying the updated file on a single system where multiple files are present and it would not be possible to execute the processing without the knowledge of which file was updated.

The primary system 1 transmits (S302, S303 and S304) to the secondary system 2, in addition to the content of the updated data (A log), the nature of the update (differentiating among updates, additions and deletions) and file identification, the number of the block where the data is stored and the leading address of the record in the block, this information attached to the former. The primary system 1 transmits to the secondary system 2 this information, with a transaction number and information, such as a transmission time stamp, allowing strict discrimination of the data sequence attached, as post-update data information. The T log and B log are handled in the same manner as with synchronous tightly-coupled transmission. Although the entire record may also be transmitted to communicate the content of the updated data, this would result in high-volume transmissions; therefore, it is possible also to extract only that portion modified and to transmit that data with its offset and length attached to it.

The secondary system 2 receives (S401 in FIG. 7) the message that a transaction has been initiated, then receives the log data of the transaction and updates (S402, S403 and S404 in FIG. 7) the affected data on the secondary system 2. After receiving (S405) from the primary system 1 the message that the transaction has been completed, once all backup updating is completed on the secondary system 2, it transmits (S406 in FIG. 7) to the primary system 1 a message that the backup has been completed. When that message arrives, the A log for that transaction may be discarded (S306 in FIG. 7) on the primary system 1, but it may also be archived if necessary. Since the A log data is reflected directly in the backup blocks of the secondary system, there is generally no need to store it, but stored A log data may prove useful for performing differential updates.

Since backups on the secondary system 2 and updates on the primary system 1 are performed asynchronously here, there is a danger that the reflection of data updates on the secondary system 2 may be reversed and the ability lost to maintain the data in its most recent state, but this danger may be avoided as described below.

When the primary system 1 transmits to the secondary system 2 logs, messages of transaction initiation or conclusion, or the like, such transmissions may include execution time stamps so as to identify the order in which processes are executed, and, so that logs are not lost en route due to transmission failure or other problems, serial numbers may also be attached to transmissions, as they are in common-variety telecommunications protocols, so that missing data may be detected and, if data is missing, retransmission may be requested and processes then executed in the order of their serial numbers. It is thus possible to maintain the integrity of data.

Although there is little possibility of transmission failure with synchronous, tightly-coupled transmission, application of the method described above would be meaningful where data integrity is of great importance.

When post-update data information arrives, the secondary system 2 immediately updates (S402, S403 and S404 in FIG. 7) the data affected on the basis of the post-update data information for the applicable transaction. References here to updating data refer to the rewriting of the affected data by replacing it with the content given in the post-update data information. The content is stored in compressed form. When all data updates for the applicable transaction have been completed, the next transaction is processed. Data backup and recovery may be effected by repeating the processes described above.

The description following is of how abnormal transaction terminations and canceled transactions are handled. The same description applies to how canceled transactions occasioned by deadlock are handled. When a transaction is canceled or suffers abnormal termination, the data updated by the affected transaction must be restored to its original state and then the next transaction processed. When a transaction is canceled or suffers abnormal termination, the primary system 1 transmits to the secondary systems 2 a message that the transaction has been canceled. In addition to specifying which transaction suffered an abnormal termination or was canceled, this message includes pre-update information (B log) on all data updated by the affected transaction. Upon receiving a message that a transaction has been canceled, the secondary systems 2 restore all the affected data to its state prior to the updates on the basis of the pre-update information. These operations are the same as those performed on the primary system 1. All secondary systems 2 transmit to the primary system 1 a message that restoration of the data has been completed.

Whereas data backup and recovery methods in the prior art that cope with damage to files have required restoration device by device or file by file, since the data backup and recovery system of the present invention manages data by means of block numbers, it is capable of performing this task in multiple stages. If the damage is local, recovery may be effected by restoring some number of blocks. Recovery may also be effected file by file or device by device, as with methods extant in the prior art, or the entire primary system 1 may be restored in multiple stages. Moreover, since traditional methods have stored data in sequential files, it has been necessary to read magnetic tapes from their beginnings in order to extract the target data, resulting in restoration operations that require significant amounts of time, but the data backup and recovery system of the present invention makes it possible to read the data directly from the target backup blocks by using the secondary location table 7. Furthermore, the blocks 6 of the primary system 1 and the blocks 8 of the secondary system 2 are also available for ready access to the target blocks.

The description following is of how failure of a secondary system 2 is handled. The primary system 1 should be an implementation distributed across multiple storage devices (memory). Failure will then almost always occur in a single part of the primary system 1. In such cases, recovery may be effected as described below.

To provide for the failure of devices, replacement devices shall be prepared in advance and these devices used. Devices prepared in advance shall be ones having capacity and performance at least equivalent to the segmented storage devices (memory) of the primary system 1. A failed storage device (memory) of the primary system 1 shall be detached from it and a replacement device allocated to replace the failed storage device (memory). The affected data that had been stored on the failed storage device (memory) shall be copied from the secondary system 2. All other processing shall be suspended while this operation is performed. Processing shall then resume when the copy is completed. Although processing is interrupted for some period of time, subsequent processing is performed at the usual speed and backup acquisition is assured.

The method described above prioritizes data integrity. An alternate method reduces the changeover time. This method may be applied in hot-swapping. Hot-swapping entails using the RAM 22 of a secondary system 2 as is for the storage device (memory) of the primary system 1. If there are two or more arrays of secondary system 2, this will cause no backup problems, but if there is only one array of the secondary system 2, the backup system will temporarily be down and so care must be taken in the operation of the system overall.

When a failure occurs, the secondary system 2 is first updated to the most recent state, then the RAM 22 of the secondary system 2 is used as is for the storage device (memory) of the primary system 1. The failed RAM 12 of the primary system 1 is detached, and a replacement device is allocated from those prepared to provide for failures. This replacement device is used as a storage device (memory) in the secondary system 2. The primary system 1 then continues normal operation. In addition, data is restored to the new replacement device of the secondary system 2 in parallel with the normal operation of the primary system 1. This entails reading the data of the replacement device sequentially from the primary system 1, transmitting it to the secondary system 2 and writing it at the secondary system 2. However, the problem arises that since data updates continue on the primary system 1 while these operations are performed, the data thus written to the secondary system 2 is not recent data, but if data in the blocks written to the allocated replacement storage device (memory) thus far from the front of the device is updated, it may be synchronized unproblematically by making transmissions from the primary system 1 to the secondary system 2 in the same manner as with regular backup procedures and then updating the blocks 8 on the secondary system 2. In addition to restoring data by means of copies when a failure occurs, data may also be regenerated to its original state if backups of the location tables and alternate key tables are maintained on the secondary system 2.

If transmission is by asynchronous, loosely-coupled transmission, the content of data on the primary system 1 and on the secondary system 2 cannot be synchronized, and the state of the data on the secondary system 2 may not keep up with the state of the data on the primary system 1. If the primary system 1 breaks down in such a situation, when the data from the secondary system 2 is copied to the primary system 1, it will not be restored to a recent state and nothing can be done about the problem. If there is data present on the secondary system 2 that has not completed updating, A logs and T logs have been transmitted to the secondary system 2 together with messages that transactions have initiated or completed. If the primary system 1 has failed, data processing will immediately be interrupted on the primary system 1. After the secondary system 2 has completed processing all transactions being processed at that point, it will process the remaining A logs and the content of the data on the secondary system 2 will achieve the same state as the content on the primary system 1, whereupon, if the required portion of the data on the secondary system 2 is compressed, that data is decompressed, returned to its state prior to compression and transmitted to the primary system 1.

The description above considers a failure of the primary system 1, but a secondary system 2 may also suffer a similar failure. The action taken in such an event is much the same as that described above. Replacement devices are prepared to provide for failure of the secondary systems 2. The devices prepared to provide for failure in the primary system 1 may be a shared reserve for both systems. A failed device in a secondary system 2 shall be detached from the system and a replacement device allocated to substitute for that storage device (memory). The affected data that had been stored in the failed device shall be copied from the primary system 1. All other processing shall be suspended while this operation is being performed. Processing shall then resume when the copy is completed.

The method described above for coping with failure of a secondary system 2 prioritizes data integrity, but if there are two or more secondary systems 2 or if there is a single secondary system 2 but processing is accorded higher priority than data integrity, the recovery method described below may be applied. When a secondary system 2 suffers failure, the action taken is entirely the same until a replacement device is allocated for the failed device. Once the replacement device is allocated, the primary system 1 continues processing. In the meantime, if there is a single secondary system 2, the data stored on the replacement device has not been backed up. That portion of data required to replenish the replacement device is transmitted from the primary system 1 to the secondary system 2 in parallel with processing on the primary system 1 and the backup file is restored. Since this entails sequential data transmissions, updates may arise to data in blocks whose transmission has been completed and there is a danger that the backups may not reflect the most recent data, but since update data is transmitted to the secondary systems 2 when updates are performed, just as when regular backups are being performed, backup of the most recent data is assured by performing the same processing as the usual processing. When data on the primary system 1 is updated that is in a block not yet backed up, the block for that data does not exist on the secondary systems 2, so the A log and other logs are discarded on the secondary systems 2.

When multiple secondary systems 2 are provided in order to provide for a failure in a secondary system 2, the failed device is detached and operations may continue with the remaining devices alone. To restore the data that had been stored in the detached device to its most recent state, it may be restored either at the point that the operation of the primary system 1 is suspended or by the method described above.

If transmission is by asynchronous, loosely-coupled transmission, the content of data on the primary system 1 and on the secondary systems 2 cannot be synchronized, and the state of the data on the secondary systems 2 may not keep up with the state of the data on the primary system 1 in the same manner as described above. If a secondary system 2 suffers a failure, the required data is copied from the primary system 1 to the secondary system 2 and the system is made operational when the copying is completed, but if there is at this point a discrepancy between the secondary system 2 and the primary system 1, first the required blocks are copied from the primary system 1 to the secondary system 2. Then the messages from the secondary system 2 that transactions have been completed are used to identify transactions that have completed on the primary system 1 but have not completed on the secondary system 2, and the applicable A logs are used to update the data content of the secondary system 2.

Several secondary advantages accrue from the use of the data backup and recovery system that is the first preferred embodiment of the present invention.

This system continuously maintains a backup of the most recent data on the secondary system 2. This makes the data on the secondary system 2 available for use in referential transaction processing of data. The ratio of update data to referential data is generally considered to be around one to ten. This means that by eliminating a referential system, one may reduce the load placed on a system handling update data. Using the secondary system 2 for referential data makes it much easier to construct a referential system that uses real-time data, and using the secondary system 2 for more than just backups results in a greater return on investment. If the secondary system 2 is used as a referential system, the data should not be compressed because processing compressed data would take more time. In addition, such use of the secondary system 2 makes alternate key table backups essential.

Further advantages of the data backup and recovery system that is the first preferred embodiment of the present invention are as follows:
(1) Great reductions in the time and trouble entailed by backups;
(2) Great reductions in the time and trouble entailed by recovery using backup data;
(3) Certainty of backups and of recovery using backup data;
(4) Reduction of storage resources and the capability of recovery by means of simple operations; and
(5) The capability of restoring data even mistakenly updated by the software.

Figure 8:
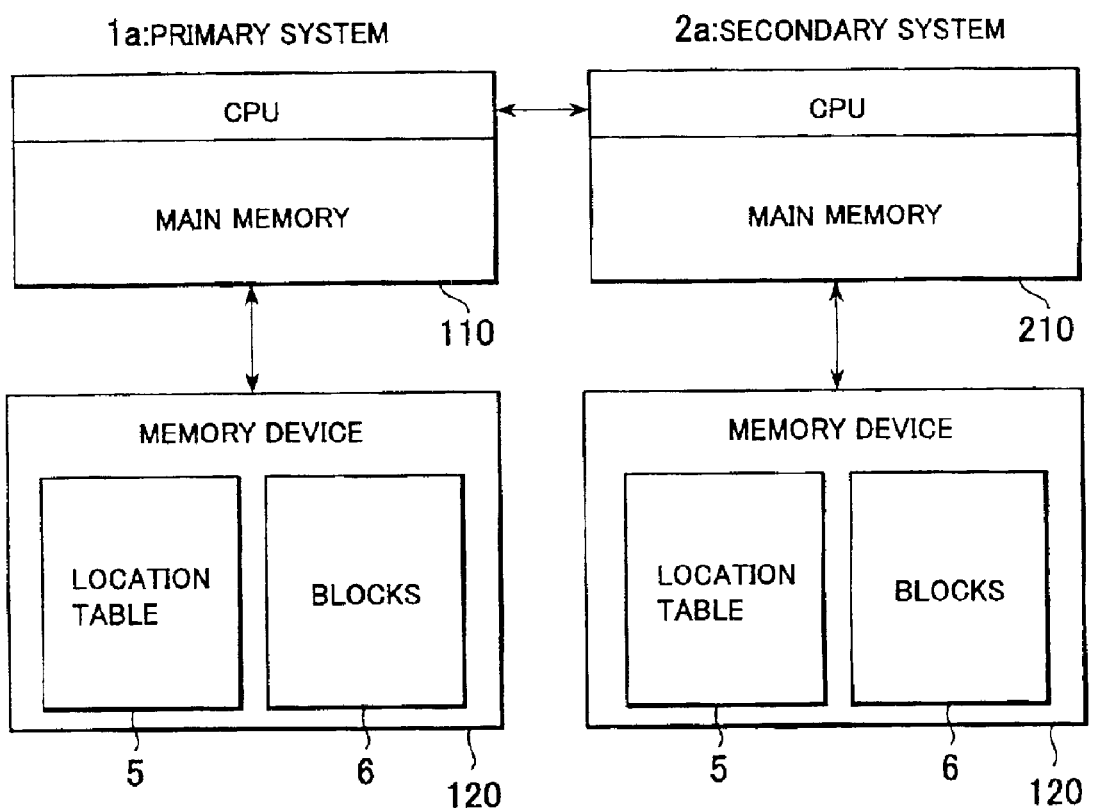
FIG. 8 is a block diagram of another configuration of a primary system and secondary system that is a second preferred embodiment of the present invention.

FIG. 8 is a block diagram of another configuration of a primary system and secondary system to implement a data backup and recovery system that is a second preferred embodiment of the present invention. The data backup and recovery system illustrated in FIG. 8 is comprised of a primary system 1*a* and a secondary system 2*a*. In greater detail, the primary system 1*a* consists of a primary system processing device 110 that performs application processing paired with, but structurally separate from, a primary system storage device 120 in internal RAM. Likewise, the secondary system 2*a* consists of a secondary system processing device 210 that executes processing tasks combined with, but structurally separate from, a secondary system storage device 220 in internal RAM.

Although not shown in the diagram, the primary system processing device 110 is provided with a means of communication for the transmission of backup data, a database control mechanism that modifies the content of the database stored in the primary system storage device and a primary backup and recovery control mechanism that transmits via the means of communication data describing modifications made to the database by the database control mechanism. The means of communication of this second preferred embodiment of the present invention is the same as the communications mechanism 13 of the first preferred embodiment or has functionality equivalent to it. Likewise, the database control mechanism of this second preferred embodiment of the present invention is the same as the database control mechanism 15 of the first preferred embodiment or has functionality equivalent to it. Again likewise, the primary backup and recovery control system of this second preferred embodiment of the present invention is the same as the primary backup and recovery control system 14 of the first preferred embodiment or has functionality equivalent to it.

As in the first preferred embodiment of the present invention, backup of the database area stored in the primary system storage device 120 is performed by means of location table 5, blocks 6, etc.

The secondary system processing device 210 is provided with a means of communication for the transmission of backup data and a secondary backup and recovery control mechanism that modifies the backup database stored in the secondary system storage device with data transmitted via the means of communication by the primary backup and control mechanism. The means of communication of this second preferred embodiment of the present invention is the same as the communications mechanism 23 of the first preferred embodiment or has functionality equivalent to it. Likewise, the secondary backup and recovery control mechanism of this second preferred embodiment of the present invention is the same as the secondary backup and recovery control mechanism 24 of the first preferred embodiment or has functionality equivalent to it.

As in the first preferred embodiment of the present invention, backups to the database area stored in the secondary system storage device 220 are performed by means of location table 7, blocks 8, etc.

This second preferred embodiment of the present invention provides implementations of the synchronous and synchronous, tightly-coupled backup operations of the first preferred embodiment. According to this second preferred embodiment of the present invention, the ease of adding and replacing storage devices may be added to the advantages of the first preferred embodiment.

Figure 9:
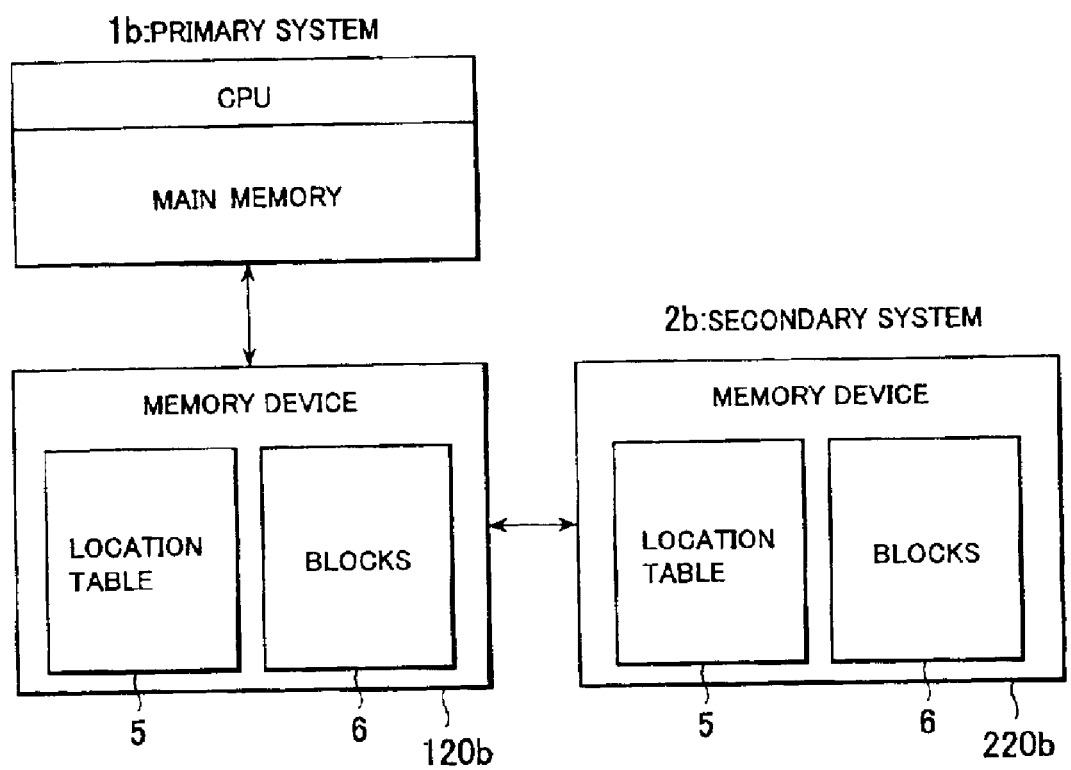
FIG. 9 is a block diagram of another configuration of a primary system and secondary system that is a third preferred embodiment of the present invention.

A variation on the data backup and recovery system of this second preferred embodiment of the present invention may have the same configuration illustrated in FIG. 9, but it processes blocks in a different fashion. The data backup and recovery system of this variation on the second preferred embodiment is also comprised of a primary system and a secondary system. It is similar also in that it provides a primary system storage device in internal RAM structurally separate from the primary system processing device and a secondary system storage device in internal RAM that is structurally separate from the secondary system processing device. It is further similar in that the primary system storage device 1*b* is provided with a means of communication, the secondary system storage device is provided with a means of communication and the backup data is transmitted between the two via the means of communication.

Where the variation differs is in that the primary system storage device is provided with a database control mechanism that modifies the content of the database contained in the primary system storage device and a primary backup and recovery control mechanism that transmits via the means of communication data describing modifications made to the database by the database control mechanism, and the secondary system storage device is provided with a secondary backup and recovery control mechanism that modifies the backup database contained in the secondary system storage device with the data transmitted via the means of communication by the primary backup and recovery control mechanism.

As in the first preferred embodiment of the present invention, backup of the database area contained in the primary system storage device of the variation on the second preferred embodiment is performed by means of a location table and one or more blocks.

Likewise, as in the first preferred embodiment of the present invention, backup to the database area contained in the secondary system storage device of the variation on the second preferred embodiment of the present invention is performed by means of a location table and one or more blocks.

This variation on the second preferred embodiment of the present invention is likewise capable of performing synchronous and synchronous, tightly-coupled backup and recovery operations as in the first preferred embodiment.

This variation on the second preferred embodiment of the present invention has the additional advantages that it is capable of backup without providing the primary and secondary system processing devices any backup mechanisms besides means of communication, as well as the ease of adding and replacing storage devices found in the standard second preferred embodiment.

The foregoing description of the preferred embodiments of the present invention is a basic one using the example of a single array of the secondary system 2, but to achieve an impeccable backup system, multiple secondary systems 2 should be provided. To prepare for disasters, in particular, two secondary systems 2 should be provided, one secondary system 2 installed near the primary system 1 and the other secondary system 2 installed at a distance from the primary system 1.

FIG. 9 is a block diagram of another configuration of a primary system and secondary system that is a third preferred embodiment of the present invention. The data backup and recovery system illustrated in FIG. 9 also comprises a primary system 1*b* and a secondary system 2*b*. In greater detail, the primary system 1*b* is provided with a primary system processing device 110*b* that performs application processing paired with, but structurally separate from, a primary system storage device 120*b* in internal RAM. The secondary system 2*b* is provided only with a secondary system storage device 220*b* in internal RAM. The primary system storage device 120*b* is provided with a means of communication and the secondary system storage device 220*b* is provided with a means of communication, so that the primary system storage device 120*b* and the secondary system storage device 220*b* are able to transmit backup data to each other.

The primary system storage device 120*b* is provided with a database control mechanism that modifies the content of the database stored in the primary system storage device and a primary backup and recovery control mechanism that transmits via the means of communication data describing modifications made to the database by the database control mechanism. The means of communication of this third preferred embodiment of the present invention is the same as the communications mechanism 13 of the first preferred embodiment or has functionality equivalent to it. Likewise, the database control mechanism of this third preferred embodiment of the present invention is the same as the database control mechanism 15 of the first preferred embodiment or has functionality equivalent to it. Again likewise, the primary backup and recovery control system of this third preferred embodiment of the present invention is the same as the primary backup and recovery control system 14 of the first preferred embodiment or has functionality equivalent to it.

The secondary system storage device 220*b* is provided with a secondary backup and recovery control mechanism that modifies the backup database stored in the secondary system storage device 220*b* with data transmitted via the means of communication by the primary backup and control mechanism. The secondary backup and recovery control mechanism of this third preferred embodiment of the present invention is the same as the secondary backup and recovery control mechanism 24 of the first preferred embodiment or has functionality equivalent to it.

As in the first preferred embodiment of the present invention, backup of the database area stored in the primary system storage device 120*b* is performed by means of location table 5, blocks 6, etc.

As in the first preferred embodiment of the present invention, backups to the database area stored in the secondary system storage device 220*b* are performed by means of location table 7, blocks 8, etc.

Variations on this third preferred embodiment of the present invention are capable of the synchronous and synchronous, tightly-coupled backup and recovery operations described for the first preferred embodiment.

This third preferred embodiment of the present invention has the additional advantages that it is capable of backup without providing the primary and secondary system storage devices any backup mechanisms besides means of communication, as well as the ease of adding and replacing storage devices found in the second preferred embodiment. Furthermore, the secondary system need be provided only a secondary system storage device, thus simplifying hardware configuration.

Application of the present invention allows list output and the execution of other referential batch processing without suspending on-line processing. Since methods extant in the prior art perform the creation of month-ahead reports and other such batch processing with on-line processing suspended and unable to perform data updates, continuous on-line processing has been problematic. The present invention achieves continuous on-line processing by halting the updating of the backup on the secondary system at some specified point in time. A message that backups will be temporarily suspended is transmitted from the primary system to the secondary system, and the secondary system then receives subsequent logs but does not perform backups. If transmissions are synchronous, tightly-coupled transmissions, the primary system unlocks data when it receives a message from the secondary system that the backup has been completed, and this applies likewise to asynchronous, loosely-coupled transmission. After receiving from the secondary system a message that backup has been completed, referential batch processing is launched. When referential batch processing is completed, the secondary system resumes updating backups, whether by explicit instruction or automatically, on the basis of the logs accumulated. When the secondary system runs out of logs accumulated for backup updates, the secondary system transmits to the primary system a message to release the suspended status of backups and returns to regular backup mode. Since the primary system and the secondary system will be temporarily unsynchronized if this method is applied, multiple secondary systems should be provided if data integrity is the top priority.

Although the primary backup and recovery control system of the foregoing preferred embodiments of the present invention transmits data describing changes made to database content when the database control mechanism makes such changes, it may well transmit that data describing the changes not simultaneously as described herein but on some other schedule, depending on processing conditions.

Although the preferred embodiments of the present invention described herein presume configuration of backup and recovery systems with both the primary system 1 and secondary systems 1 installed within the country of Japan, the primary system 1 may be installed in Japan and the secondary systems 2 in a foreign country or the primary system 1 installed in a foreign country and the secondary systems 2 in Japan, and all such configurations of a backup and recovery system fall within the scope of the present invention.

Although the preferred embodiments of the present invention described herein presume installation of both the primary system 1 and the secondary system 2 by the same personality, the primary system 1 and the secondary system 2 may, of course, be installed by different personalities. Any installation of an instance of primary system 1 and an instance or instances of secondary system 2 falls within the scope of this invention.

What is claimed is:

1. A data backup and recovery system for computers, comprising:

blocks storing sequentially records containing a single unique key and zero or one or more non-unique keys;

a primary system that controls the location of these blocks by means of a location table pairing the blocks with physical addresses in random access memory and manages a database or databases stored in random access memory; and a secondary system or systems that is provided with backup blocks corresponding to the blocks of the said primary system in which the source data is stored, controls the location of these blocks by means of a location table pairing the blocks with physical addresses in random access memory, and manages a database or databases stored in random access memory, wherein said primary system transmits to the secondary system or systems the content of updated data and information, specifying the blocks where updated content, data and pre-updated information is stored, said secondary system or systems are provided with a synchronous tightly-coupled or an asynchronous loosely-coupled sequencing system arranged to receive transaction initiation information from said primary system and then receive log completion information to said primary system after receiving transaction completion information from the primary system until that backup update processing is complete, and when a transaction is canceled or suffers abnormal termination and the primary system receives a message that the transaction has been canceled, the primary system transmits to the secondary system or systems said message, and the secondary systems restore all affected data back to the state prior to the updates on the basis of the pre-updated information.

2. A data backup and recovery system for computers, comprising:

blocks storing sequentially records containing a single unique key and zero or one or more non-unique keys;

a primary system that controls the location of these blocks by means of a location table pairing the blocks with physical addresses in random access memory and manages a database or databases stored in random access memory; and a secondary system or systems, that is provided with backup blocks corresponding to the blocks of the said primary system in which the source data is stored, controls the location of these blocks by means of a location table pairing the blocks with physical addresses in random access memory, and manages a database or databases stored in random access memory, wherein said primary system uses the main memory of the primary processing device that performs application processing as said random access memory and is provided with a database control mechanism that modifies the content of a database or databases in said random access memory and a primary backup and recovery control mechanism that transmits data describing those modifications when the said database control mechanism has modified said database or databases;

said secondary system or systems use the main memory of the secondary processing device as random access memory and are provided with a secondary backup and recovery control mechanism that modifies the backup database in said random access memory with the data transmitted from said primary backup and recovery control mechanism said primary system transmits to the secondary system or systems the content of updated data and information specifying the blocks where updated content, data and pre-updated information is stored, said secondary system or systems are provided with a synchronous tightly-coupled or an asynchronous loosely-coupled sequencing system arranged to receive transaction initiation information from said primary system and then receive ba completion information to said primary system after receiving transaction completion information from the primary system until that backup update processing is complete, and when a transaction is canceled or suffers abnormal termination and the primary system receives a message that the transaction has been canceled, the primary system transmits to the secondary system or systems said message, and the secondary systems restore all affected data back to the state prior to the updates on the basis of the pre-updated information.

3. A data backup and recovery system for computers, comprising:

blocks storing sequentially records containing a single unique key and zero or more non-unique keys;

a primary system that controls the location of these blocks by means of a location table pairing the blocks with physical addresses in random access memory and manages a database or databases stated in random access memory; and a secondary system or systems that is provided with backup blocks corresponding to the blocks of the said primary system in which the source data is stored, controls the location of these blocks by means of a location table pairing the blocks with physical addresses in random access memory, and manages a database or databases stored in random access memory, wherein said primary system is equipped with primary processing device that performs application processing and a primary storage device made up of random access memory that stores a database or databases apart from the main memory of the primary processing device;

said secondary system or systems are equipped with a secondary storage device made up of random access memory that stores a database or databases;

said primary storage device is provided with means of performing backup data communication, a database control mechanism that modifies the content of said database or databases, and a primary backup and recovery control mechanism that transmits via said means of communication data describing those modifications when said database control mechanism has modified the content of said database or databases;

said secondary storage device is provided with a means of performing backup data communication and a secondary backup and recovery control mechanism that modifies said backup database or databases with the data transmitted via said means of communication from said primary backup and recovery control mechanism;

said primary system transmits to the secondary system or systems the content of updated data and information specifying the blocks where updated content, data and pre-updated information is stored, said secondary system or systems are provided with a synchronous tightly-coupled or an asynchronous loosely-coupled sequencing system arranged to receive transaction initiation information from said primary system and then receive log completion information to said primary system after receiving transaction completion information from the primary system until that backup updated processing is complete, and when a transaction is canceled or suffers abnormal termination and the primary system receives a message that the transaction has been canceled, the primary system transmits to the secondary system or systems said message, and the secondary systems restore all affected data back to the state prior to the updates on the basis of the pre-updated information.

4. A data backup and recovery system for computers, comprising:

blocks storing sequentially records containing a single unique key and zero or one or more un-unique keys;

a primary system that controls the location of these blocks by means of a location table pairing the blocks with physical addresses in random access memory and manages a database or databases stored in random access memory; and a secondary system or systems that are provided with backup blocks corresponding to the blocks of said primary system in which the source data is stored, controls the location of these blocks by means of a location table pairing the blocks with physical addresses in random access memory, and manages a database or databases stored in random access memory, wherein said primary system transmits to the secondary system or systems the content of updated data and information specifying the blocks where undated content, data and pre-updated information is stored, said secondary system or systems are provided with a synchronous tightly-coupled or an asynchronous loosely-coupled sequencing system arranged to receive transaction initiation information from said primary system and then receive log completion information to said primary system after receiving transaction completion information from the primary system until that backup update processing is complete, and when a transaction is canceled or suffers abnormal termination and the primary system receives a message that the transaction has been canceled, the primary system transmits to the secondary system or systems said message, and the secondary systems restore all affected data back to the state prior to the updates on the basis of the pre-updated information.

5. A data backup and recovery system for computers, comprising:

blocks storing sequentially records containing a single unique key and zero or one or more non-unique keys;

a primary system that controls the location of these blocks by means of a location table pairing the blocks with physical addresses in random access memory and manages a database or databases stored in random access memory; and a secondary system or systems that is provided with backup blocks corresponding to the blocks of the said primary system in which the source data is stored, controls the location of these blocks by means of a location table pairing the blocks with physical addresses in random access memory, and manages a database or databases stored in random access memory, wherein said primary system transmits to the secondary system or systems the content of updated data and information specifying the blocks where update content and data are stored; and said secondary system or systems are provided with a synchronous tightly-coupled or an asynchronous loosely-coupled sequencing system arranged to receive transaction initiation information from the said primary system and then receive log data during the transaction and update the relevant data, and to flat transmit backup completion information to the said primary system after receiving transaction completion information from the primary system until that backup update processing has completed, and when a transaction is canceled or suffers abnormal termination and the primary system receives a message that the transaction has been canceled, the primary system transmits to the secondary system or systems said message, and the secondary systems restore all affected data back to the state prior to the updates on the basis of the pre-updated information.

6. A data backup and recovery system for computers, comprising:

blocks storing sequentially records containing a single unique key and zero or one or more non-unique keys;

a primary system that controls the location of these blocks by means of a location table pairing the blocks with physical addresses in random access memory and manages a database or databases stared in random access memory; and a secondary system or systems that is provided with backup blocks correspond to the blocks of the said primary system in which the source data is stored, controls the location of these blocks by means of a location table pairing the blocks with physical addresses in random access memory, and manages a database or databases stored in random access memory, wherein said primary processing device and secondary processing device are equipped with communicating means that performs communications of backup data between them;

said primary storage device is provided with a database control mechanism that modifies the content of said database or databases and a primary backup and recovery control mechanism that transmits via said communicating means data describing updates when said database control mechanism has modified the content of the said database or databases; and the said secondary storage device is provided with a secondary backup and recovery control mechanism that modifies said backup database or databases with the data transmitted via said communicating means from the said primary backup and recovery control mechanism.

* * * * *